United States Patent
Rajendran et al.

(10) Patent No.: US 12,517,998 B2
(45) Date of Patent: Jan. 6, 2026

(54) IMPLEMENTING MULTI-PARTY AUTHORIZATIONS TO THWART A RANSOMWARE ATTACK

(71) Applicant: Nutanix, Inc., San Jose, CA (US)

(72) Inventors: Ashwini Rajendran, Sunnyvale, CA (US); William O'Donnell, Wisconsin Rapids, WI (US); Heli Utpal Modi, San Jose, CA (US); James Sarantos, Berlin (DE); Malay Prajapati, Dublin, CA (US); Mark Nijmeijer, San Jose, CA (US); Naveen Kumar, Bengaluru (IN); Sandeep Jeevraj Parmar, Pune (IN); Sasthakumar Ramamurthy, Milpitas, CA (US); Ketan Shah, Sunnyvale, CA (US)

(73) Assignee: Nutanix, Inc., San Jose, CA (US)

( * ) Notice: Subject to any disclaimer, the term of this patent is extended or adjusted under 35 U.S.C. 154(b) by 219 days.

(21) Appl. No.: 17/816,363

(22) Filed: Jul. 29, 2022

(65) Prior Publication Data

US 2024/0037213 A1    Feb. 1, 2024

(51) Int. Cl.
*G06F 21/44*    (2013.01)
*G06F 21/56*    (2013.01)

(52) U.S. Cl.
CPC .......... *G06F 21/445* (2013.01); *G06F 21/56* (2013.01); *G06F 2221/031* (2013.01)

(58) Field of Classification Search
CPC ...... G06F 21/57; G06F 9/45558; G06F 21/53; G06F 21/577; G06F 21/575; G06F 21/56;
(Continued)

(56) References Cited

U.S. PATENT DOCUMENTS 8,549,518 B1   10/2013   Aron et al.
8,601,473 B1   12/2013   Aron et al.
(Continued)

OTHER PUBLICATIONS

Poitras, Steven. "The Nutanix Bible" (Sep. 9, 2022), from https://nutanixbible.com/ (Publication date based on indicated capture date by Archive.org; first publication date unknown).
(Continued)

*Primary Examiner* — Tae K Kim
(74) *Attorney, Agent, or Firm* — Vista IP Law Group, LLP

(57) ABSTRACT

Methods, systems, and computer program products for thwarting a malware attack. A data storage system stores data items, some of which data items correspond to snapshots. Upon identification of a possible ransomware attack on a data item, the system identifies a version of the snapshot that is not subject to the ransomware attack and seeks to protect the data state of the system from further damage (e.g., due to performance of unauthorized operations on the version of the snapshot that is not subject to the ransomware attack) by requiring consensus from a multi-party authorization (MPA) consensus regime before carrying out requested operations over the snapshot. The MPA consensus regime operates by determining that the operation is subject to a role-based access control (RBAC) as well as a multi-party authorization (MPA) consensus protocol, and then allowing or denying execution of the requested operations based on achieving consensus from among candidate approvers.

24 Claims, 14 Drawing Sheets

(58) Field of Classification Search
CPC ...... G06F 21/566; G06F 21/562; G06F 21/55; G06F 21/565; G06F 8/71; G06F 8/73; G06F 8/70; G06F 8/63; G06F 8/61; G06F 8/60

See application file for complete search history.

(56) References Cited

U.S. PATENT DOCUMENTS

| | | | |
|---|---|---|---|
| 8,850,130 | B1 | 9/2014 | Aron et al. |
| 9,231,955 | B1 | 1/2016 | Mehresh et al. |
| 9,602,508 | B1* | 3/2017 | Mahaffey ............... H04L 9/3271 |
| 9,772,866 | B1 | 9/2017 | Aron et al. |
| 10,817,392 | B1* | 10/2020 | McAuliffe .......... G06F 11/2071 |
| 2012/0072910 | A1 | 3/2012 | Martin et al. |
| 2017/0039388 | A1 | 2/2017 | Vas et al. |
| 2018/0131579 | A1 | 5/2018 | Jacobs et al. |
| 2018/0240121 | A1 | 8/2018 | Szoke et al. |
| 2018/0270249 | A1 | 9/2018 | Joshi |
| 2021/0014072 | A1* | 1/2021 | Liu ........................ G06F 21/602 |
| 2021/0216648 | A1* | 7/2021 | Child ..................... G06F 21/604 |
| 2021/0286677 | A1* | 9/2021 | Anthony ................. G06F 3/065 |
| 2021/0334374 | A1* | 10/2021 | Vasudeva ................ G06F 21/54 |
| 2021/0392151 | A1* | 12/2021 | Lakhani .................. H04L 63/20 |
| 2022/0300633 | A1 | 9/2022 | Levasseur et al. |
| 2023/0162188 | A1* | 5/2023 | Silver ................ G06Q 20/3276 705/67 |
| 2023/0239321 | A1* | 7/2023 | Doshi ................. H04L 63/1466 726/23 |
| 2023/0252168 | A1* | 8/2023 | Savir .................... H04L 9/3247 726/26 |
| 2023/0252169 | A1 | 8/2023 | Savir et al. |
| 2023/0273999 | A1* | 8/2023 | Nazari ................... G06F 9/4401 726/23 |
| 2023/0325500 | A1* | 10/2023 | Patrick .................. G06F 21/565 726/22 |
| 2023/0401337 | A1* | 12/2023 | Wu ....................... G06F 21/629 |
| 2024/0007461 | A1* | 1/2024 | Reed .................. H04L 63/1441 |

OTHER PUBLICATIONS

"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Cano, I. et al., "Curator: Self-Managing Storage for Enterprise Clusters", 14th USENIX Symposium on Networked Systems Design and Implementation, NSDI '17, (Mar. 27, 2017).
Cremers, C., et al., "A Family of Multi-Party Authentication Protocols," Eindhoven University of Technology, Department of Mathematics and Computer Science, P.O. Box 513, NL-5600 MB Eindhoven, The Netherlands, dated Mar. 2018.
Hyland-Wood, D., et al., Methods for Securing Spacecraft Tasking and Control via an Enterprise Ethereum Blockchain, dated Oct. 2019.
Zoysa, T., "A Model of Security Architecture for Multi-Party Transactions," Stockholm University, Mar. 2003.
Sandhu, R., et al., "Role-Based Access Control Models," IEEE Computer, vol. 29, No. 2, Feb. 1996, pp. 38-47.
Sandhu, R., et al., "The NIST Model for Role-Based Access Control: Towards A Unified Standard," Laboratory for Information Security Technology, dated 2000.
Lin, W., "Secure Multi-Party Authorization in Clouds," Graduate School of the Ohio State University, dated 2015.
"DXi Secure Snapshot", Quantum Technology Brief, Copyright 2021.
"Definitive Guide to Zero Trust Data Management™," rubrik White Paper, Zero Trust Data Management, dated Feb. 14, 2022 (date found via Google).
Dutt, R. "How Backup Immutability Defends Against Ransomware Attacks," Cohesity, dated Mar. 24, 2021.
"Defend Against Ransomware and Insider Threats With Data Isolation," Cohesity, dated Feb. 1, 2022 (date found via Google).
Dutt, R., "Guarding Against Ransomware Requires More Than Just Detection," Cohesity, dated Jan. 23, 2019.
Non-Final Office Action for U.S. Appl. No. 17/816,352 dated Apr. 17, 2024.
Final Office Action for U.S. Appl. No. 17/816,352 dated Aug. 14, 2024.
Final Office Action for U.S. Appl. No. 17/816,352 dated Oct. 25, 2024.
Notice of Allowance for U.S. Appl. No. 17/816,352 dated Feb. 3, 2025.
"Introducing more granular controls for multi-party approvals for sensitive admin actions," Google Workplace Updates, URL: https://workspaceupdates.googleblog.com/2025/06/more-granular-controls-for-multi-party-approvals-for-sensitive-admin-actions.html#:~:text=What's%20changing,Account%20%3E%20Admin%20Roles, dated Jun. 27, 2025.
"Configuring Authentication Methods in VMware Cloud Foundation," Broadcom, URL: https://techdocs.broadcom.com/us/en/vmware-cis/other/vmware-cloud-foundation-identity/25-0/ vmware-cloud-foundation-identity-broker-authentication /configuring-authentication-in-vmware-cloud -foundation-identity.html, dated Novemebr 20, 2024.
"Configure multi-level approval policies in Automation Service Broker," Broadcom, URL: https://techdocs.broadcom.com/us/en/vmware-cis/aria /aria-automation/8-16/consumption-on-prem-using-master-map-8-16 /service-catalog-setting-up-service-catalog-for-your-organization/ service-broker-policies-setting-up-policies/

(56) References Cited

OTHER PUBLICATIONS service-broker-policies-how-do-i-configure-approval-policies/service-broker-policies-how-do-i-configure-multi-level-approvals.html, dated Jul. 2, 2025.

Peterson, B., "VMware Aria Automation Approval Policies," URL: https://www.brockpeterson.com/post/vmware-aria-automation-approval-policies#:~:text=VMware%20Aria%20Automation%2C%20formerly%20known%20as%20vRealize,Automation%20Approval%20Policies%2C%20let's%20take%20a%20look!, dated Dec. 3, 2022.

Riccio, V., "Approval Policies in vRealize Automation," VMWare by Broadcom, URL: https://blogs.vmware.com/management/2020/10/approvals-in-vra.html, dated Oct. 6, 2020.

"How do I configure Automation Service Broker approval policies," Broadcom, URL: https://techdocs.broadcom.com/us/en/vmware-cis/aria/aria-automation/8-16/consumption-on-prem-using-master-map-8-16/service-catalog-setting-up-service-catalog-for-your-organization/service-broker-policies-setting-up-policies/service-broker-policies-how-do-i-configure-approval-policies.html, dated Jul. 2, 2025.

Thylander, A., "Announcing VMware vRealize Automation 8.1," URL: https://blogs.vmware.com/management/2020/03/announcing-v realize-automation-8-1.html#:~ :text=Enhanced%20Governance%20with%20Pre%2DConfigured%20Approval%2 0Policies.%20vRealize,actions%2C%20which%20require%20approvals%20before %20being%20initiated., dated Mar. 10, 2020.

"Approval Policy Considerations," Broadcom, URL: https://techdocs.broadcom.com/us/en/vmware-cis/aria/aria-automation/8-18/transition-guide-on-prem-master-map-8-1 8/migrating-vra-7-infrastructure/approva l-policy-considerations.html#:~:text=Last%20Updated%20July%2010%2C%202025&text=8%20includes%20these%20approval%20policy%20considerations.&text=8%20do%20not%20support:,Approvals%20by%20Email, dated Jul. 10, 2025.

\* cited by examiner

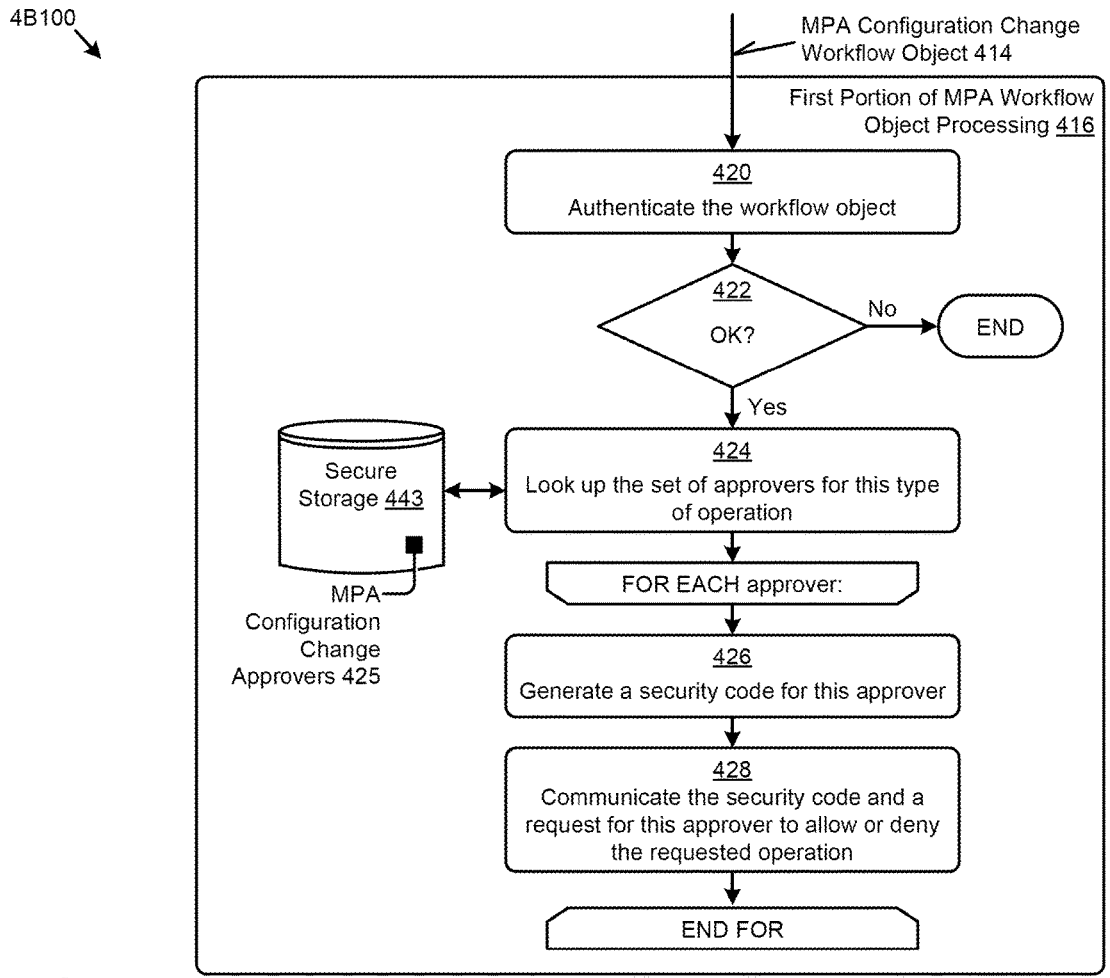
FIG. 4B1
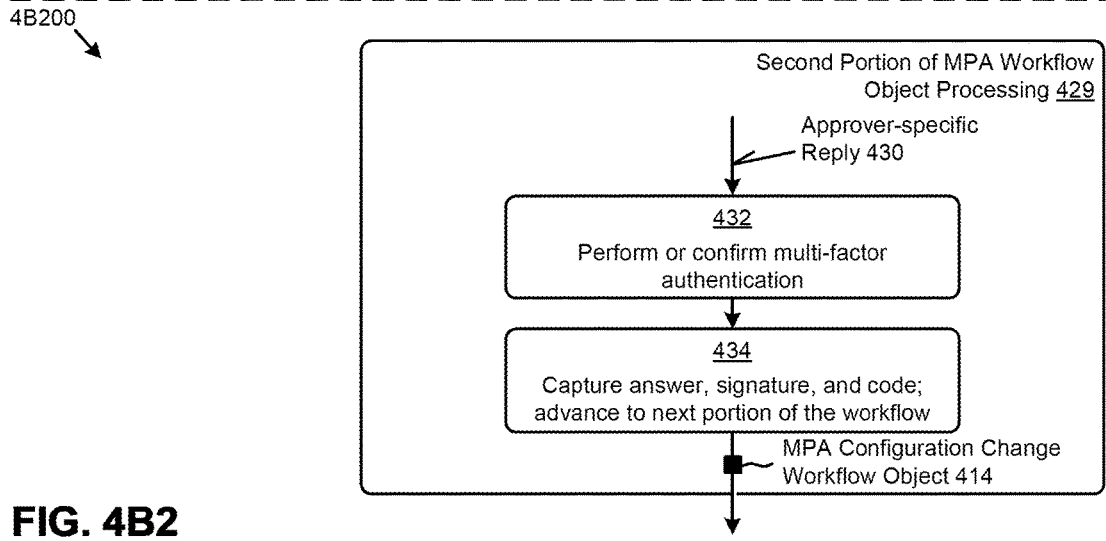
FIG. 4B2

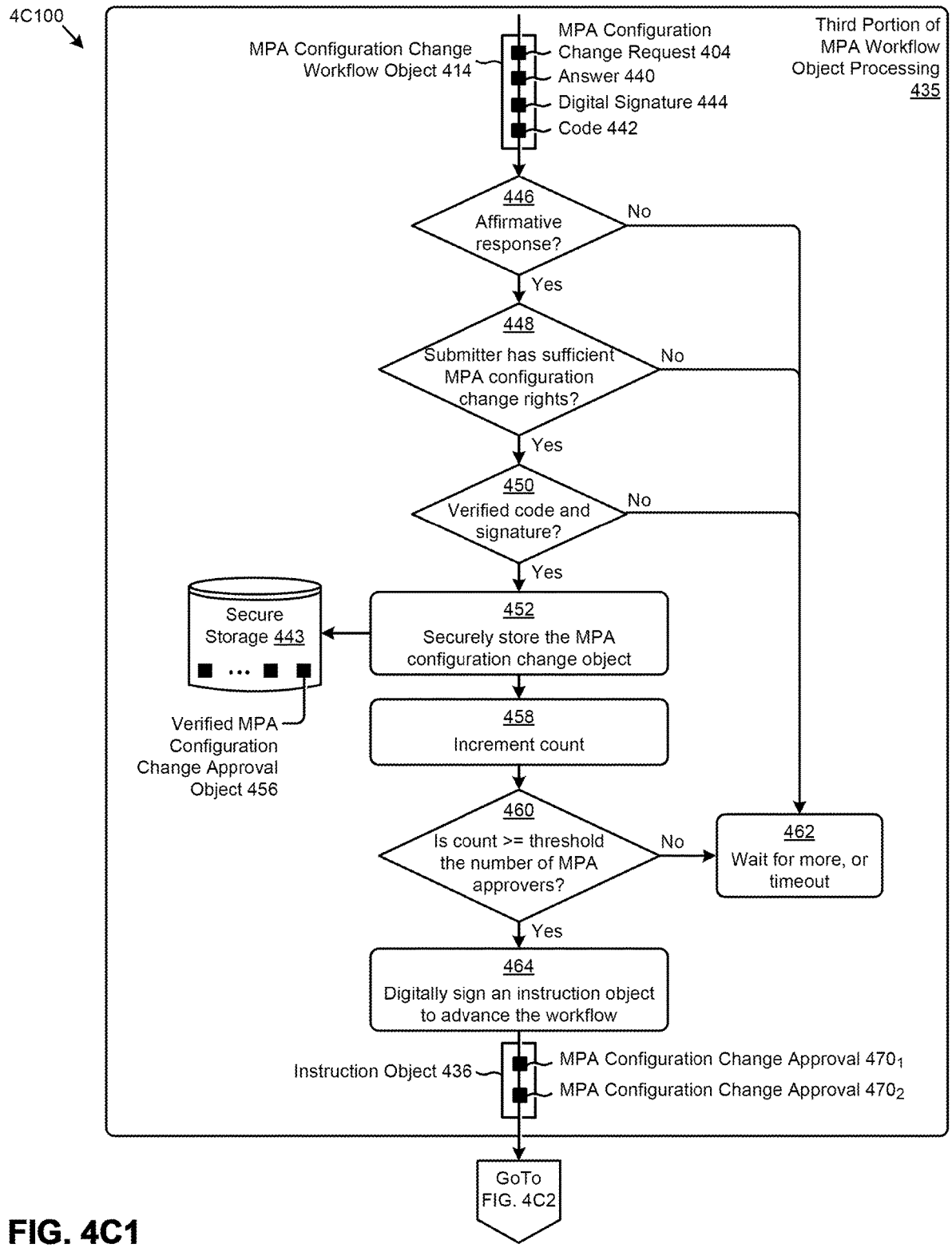
FIG. 4C1

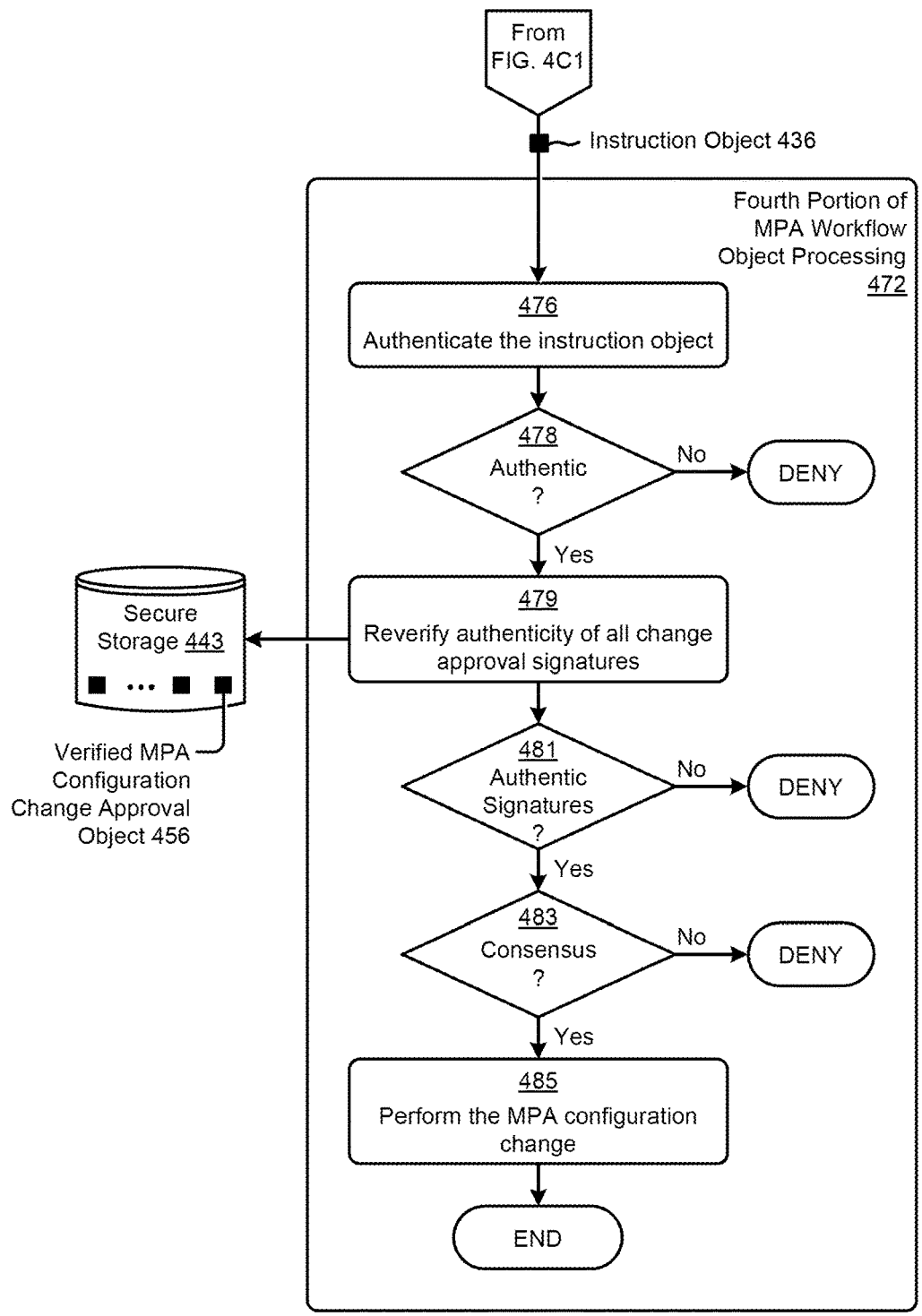
FIG. 4C2

ID $^{(1)}$

IMPLEMENTING MULTI-PARTY AUTHORIZATIONS TO THWART A RANSOMWARE ATTACK

RELATED APPLICATIONS

The present application claims the benefit of priority to co-pending U.S. patent application Ser. No. 17/816,352 titled "IMPLEMENTING MULTI-PARTY AUTHORIZATIONS WITHIN AN IDENTITY AND ACCESS MANAGEMENT REGIME", filed on even date herewith, which is hereby incorporated by reference in its entirety.

TECHNICAL FIELD

This disclosure relates to virtualized computing clusters, and more particularly to techniques for implementing multi-party authorizations within an identity and access management regime.

BACKGROUND

In present times, computing clusters are everywhere. In past times, some measure of security was provided by virtue of having a secure physical boundary around a computer or group of interrelated computers (e.g., a computing cluster). Recently, however, computing clusters are being implemented in public settings (e.g., in public clouds). In past times, a permissions model that offered a simple READ/WRITE/EXECUTE allow/deny model was sufficient. However, as computing has become more and more distributed (e.g., Internet-connected) and more and more vulnerable to hacking (e.g., over the World Wide Web), more sophisticated security and access models such as role-based access control (RBAC) has emerged. While role-based access controls provide a higher degree of security than simple READ/WRITE/EXECUTE allow/deny models, there are many situations where even RBAC-compliant access controls are insufficient.

As one example of a situation where even RBAC-compliant access controls are insufficient, it sometimes happens that computing clusters are targeted by malicious actors who gain access to credentials via the practice of phishing. Indeed, phishing has proven to be an effective way to get a computing cluster administrator's credentials, thus giving the malicious actor (e.g., ransomware deployer) credentials that are identical to, or are indistinguishable from, the cluster administrators credentials. As such, a malicious actor can pose as the computing cluster's administrator (e.g., take on an administrative role that is managed by and within the RBAC regime), and can thus gain access to a wide range of data stored on or in or by the computing cluster.

The potential effects of malicious acts taken over a computing cluster (e.g., data being modified by ransomware) is far too high to rely solely on the RBAC model. To illustrate, once having successfully phished for and obtained a computing cluster's administrators' credentials, a malaprop might install ransomware on the computing cluster, then execute the ransomware so as to encrypt the data of the computing cluster until such time as a ransom payment has been made. In this case, the RBAC model permitted the malaprop-posing as the cluster administrator—to install and run a ransomware program. As such, even though the RBAC model performed as designed, the RBAC model failed to thwart the security hole where computing cluster credentials were misappropriated by a malicious actor.

There are many approaches to thwart malicious attacks (e.g., by educating cluster administrators). However, in spite of such approaches, it remains that the weakest link in computing cluster security is the human (e.g., the computing cluster's administrator). Leaving a computing cluster open to this fallible weakest link is unacceptable for most computing cluster operators.

What is needed is a way to reduce the risk of malicious or inadvertent computing cluster data modifications.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for implementing multi-party authorizations within an identity and access management regime, which techniques advance the relevant technologies to address technological issues with legacy approaches. More specifically, the present disclosure describes techniques used in systems, methods, and in computer program products that implement the advances. Certain embodiments are directed to technological solutions for providing multi-party operation approval consensus prior to modification of computing cluster data items.

The disclosed embodiments modify and improve over legacy approaches. In particular, the herein-disclosed techniques provide technical solutions that address the technical problems attendant to reducing the risk of malicious or inadvertent computing cluster data modifications. Such technical solutions involve specific implementations (e.g., data organization, data communication paths, module-to-module interrelationships, etc.) that relate to the software arts for improving computer functionality.

The ordered combination of steps of the embodiments serve in the context of practical applications that perform steps for providing multi-party operation approval consensus prior to modification of computing cluster data items. As such, techniques for providing multi-party operation approval consensus prior to modification of computing cluster data items overcome long-standing yet heretofore unsolved technological problems associated with reducing the risk of malicious or inadvertent computing cluster data modifications that arise in the realm of computer systems.

Many of the herein-disclosed embodiments for providing multi-party operation approval consensus prior to modification of computing cluster data items are technological solutions pertaining to technological problems that arise in the hardware and software arts that underlie virtualized computing clusters. Aspects of the present disclosure achieve performance and other improvements in peripheral technical fields including, but not limited to, hyperconverged computing platform management and identity and access management capabilities.

Some embodiments include a sequence of instructions that are stored on a non-transitory computer readable medium. Such a sequence of instructions, when stored in memory and executed by one or more processors, causes the one or more processors to perform a set of acts for providing multi-party operation approval consensus prior to modification of computing cluster data items.

Some embodiments include the aforementioned sequence of instructions that are stored in a memory, which memory is interfaced to one or more processors such that the one or more processors can execute the sequence of instructions to cause the one or more processors to implement acts for providing multi-party operation approval consensus prior to modification of computing cluster data items.

In various embodiments, any combinations of any of the above can be organized to perform any variation of acts for implementing multi-party authorizations that are combined with an RBAC model of an identity and access management regime, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 4B1 exemplifies an MPA configuration change approver enumeration technique as used in systems that implement secure, multi-party authorizations within an identity and access management regime, according to an embodiment.

FIG. 4B2 exemplifies an approver-specific request handling technique as used in systems that implement secure, multi-party authorizations within an identity and access management regime, according to an embodiment.

FIG. 4C1 exemplifies a configuration change instruction object generation technique as used in systems that implement secure, multi-party authorizations within an identity and access management regime, according to an embodiment.

FIG. 4C2 exemplifies a configuration change verification and consensus verification technique as used in systems that implement secure, multi-party authorizations within an identity and access management regime, according to an embodiment.

DETAILED DESCRIPTION

Figure 1A:
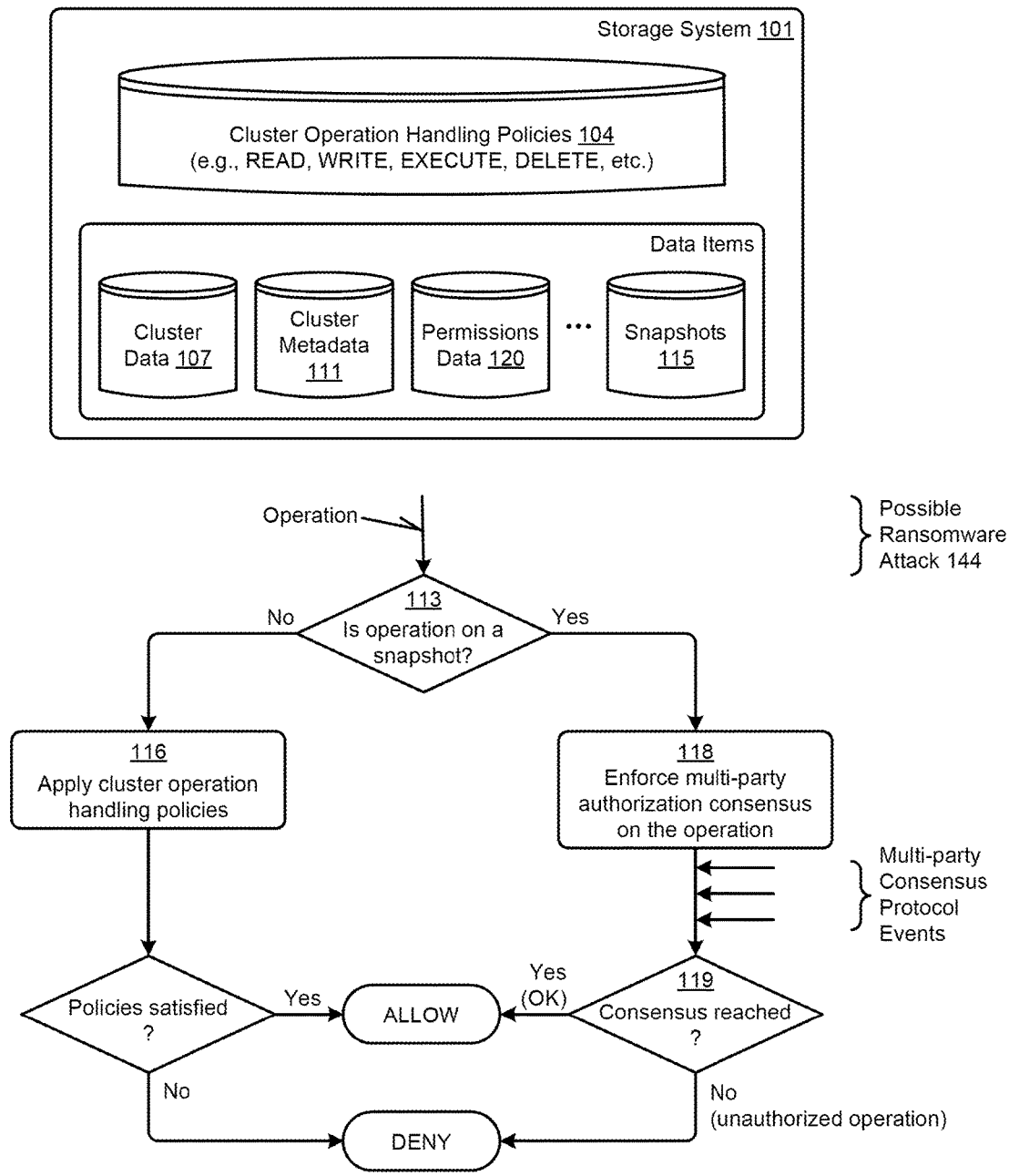
FIG. 1A exemplifies a ransomware thwarting technique that protects snapshots using a multi-party authorization consensus protocol, according to an embodiment.

Aspects of the present disclosure solve problems associated with using computer systems for reducing or eliminating unwanted effects malicious or inadvertent computing cluster data modifications. Some embodiments are directed to approaches for providing multi-party operation approval consensus prior to modification of computing cluster data items. The accompanying figures and discussions herein present example environments, systems, methods, and computer program products for implementing multi-party authorizations within an identity and access management regime.

Overview

Many computing clusters rely on an identity and access management (IAM) facility that is accessible by the cluster. Especially in situations where there are many users of a computing cluster, computing clusters rely on an identity and access management (IAM) facility that implements and enforces role-based or attribute-based access control (RBAC). To reduce the impact of malicious or inadvertent computing cluster data modifications (e.g., via a ransomware attack), the disclosure hereunder describes how an RBAC model can be extended to include multi-party authorizations (MPAs). In a multi-party authorization regime, multiple human actors are involved in consideration/authorization as to whether or not a particular operation (e.g., READ, WRITE, EXECUTE, INSTALL, etc.) is permitted to be performed on a particular computing cluster data item. In some embodiments as discussed hereunder, an operational module of an identity and access management facility is configured to be able to retrieve and process access control records for a wide range of computing cluster data (e.g., cluster configuration data, node configuration data, virtual machine configuration data, etc.).

The aforementioned operational module can be part of, or interfaced with an identity and access management facility, and can be configured to consider not only the existence of permissions, roles and attributes, but also the existence of any MPA enforcement requirement that might pertain to a particular computing cluster data item or cluster operation. In exemplary scenarios, the identity and access management facility can be configured to respond to the existence of any MPA enforcement requirement by invoking an MPA workflow. Such an MPA workflow serves to securely obtain two or more (i.e., multi-party) authorizations from two or more human participants.

Policies might define and/or be associated with MPA enforcement requirements. Such a policy might include a first line of defense against malicious or inadvertent data item modifications. In some cases, policy might deny certain data item modifications before even considering the authentication of the agent that is attempting to modify a data item. On the other hand, it can happen that the policy does permit particular types of operations over, or modifications to, a particular cluster data item. Mechanisms for determining whether or not to perform a particular operation, or whether or not to allow modifications to a particular cluster data item, can be implemented by extending the RBAC model to include MPAs. More specifically, any particular data item of a computing cluster can have an associated record, which record, in addition to codifying RBAC permissions and roles corresponding to the particular data item, also includes an indication that an MPA regime is to be observed.

In some cases, enforcement of an MPA regime is carried out by multiple instances of MPA workflows that independently and/or in combination securely obtain authorizations from multiple parties. In some embodiments, obtaining the aforementioned authorizations from multiple parties includes generation of a limited effectivity security code for each of the multiple parties. A policy defines how many of such authorizations from multiple parties constitutes whether or not to allow particular operations over the cluster, or whether or not to allow modifications to the subject cluster data item. In some cases, only a majority number of such authorizations from multiple parties is needed to constitute a permission grant. In other cases, all of such authorizations from multiple parties is needed to constitute a permission grant.

In the former case where only a majority number of authorizations from multiple parties is needed to constitute a permission grant, it can happen that one or more of the multiple parties who are consulted might be unreachable or might be unresponsive to a particular authorization request. To handle such cases, a watchdog timer is implemented. If the watchdog timer expires and there remains an insufficient number of authorizations, then the request to allow a particular operation over the cluster, or whether to allow modifications to the subject cluster data item, is denied. As such, it can now be seen that, in accordance with MPA enforcement, even if a malaprop were able to maliciously pose as one (or even several) of the multiple parties, the MPA enforcement would nevertheless serve to thwart malicious operations on the computing cluster.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1A exemplifies a ransomware thwarting technique that protects snapshots using a multi-party authorization consensus protocol. As an option, one or more variations of ransomware thwarting technique 1A00 or any aspect thereof may be implemented in the context of the architecture and functionality of the embodiments described herein and/or in any environment.

The figure is being presented to illustrate how a possible ransomware attack 144 can be thwarted by handling operations over snapshot data differently than how operations over non-snapshot data are handled. More specifically, the shown flow includes a test 113 that serves to determine whether a particular operation (which could be part of a ransomware attack) should be handled using a multi-party consensus protocol.

A requirement to invoke a multi-party consensus protocol be based on an occurrence of the operation in a list of operations that are deemed as critical such as, for example an operation carrying the semantics of 'Delete VM Snapshot', or an operation carrying the semantics of 'Update VM Snapshot', or an operation carrying the semantics of 'Allow Virtual Machine Power Off', or carrying the semantics of 'Create New Operation Access Policy', etc. Additionally, in order to track certain critical data items, any creation of a new operations access policy (OAP) triggers determination of the criticality of underlying operations and or data items. Additionally, creation of a new operations access policy triggers a demand for user-specific information that is use for contacting the user as may be needed for operation approvals. Strictly as examples, user-specific information may be demanded via a graphical user interface that may demand input of information such a user's name, a user's unique user ID, a user's role, an email alias, a phone number, etc. Such user information can be used when invoking an MPA workflow.

As used herein, a "ransomware attack" refers to execution of a particular type of malware, where the malware deletes, encrypts, or otherwise changes data items of a computing cluster and then raises a demand for remuneration (e.g., a demanded amount or a demanded action) in exchange for restoration of the cluster data items to a state that existed prior to the deletion, encryption, or destruction. Ransomware is effective when the cluster state cannot be restored except by acceding to the demands. The unwanted effects of ransomware, specifically the inability to restore the cluster data items to a state that existed prior to the attack can be thwarted through implementation of the techniques discussed herein. Moreover, some of the techniques disclosed herein, specifically, extension of a permissions model to include multi-party authorizations.

The shown flow operates in the context of a computing cluster that is and/or hosts a storage system 101. Such a storage system may include snapshots 115 as well as various corpora of cluster data 107, cluster metadata 111, permissions data 120, etc. Additionally, the storage system may store policies (e.g., the shown cluster operation handling policies 104). Such policies can be persistently store in the storage system, and may refer individually or collectively to various cluster operations (e.g., READ operations, WRITE operations, EXECUTE operations, DELETE operations, etc.).

Once such policies (e.g., the shown cluster operation handling policies 104) have been established, the policies can be applied (e.g., enforced) over any operation over the cluster configuration and/or over any operation on any data item of the cluster.

In some situations, an operation might correspond to activities that derive from a possible ransomware attack 144. At that moment in time, the system might not know that it is under attack. Nevertheless, one or more of the cluster operation handling policies 104 might enforce special handling of snapshots, irrespective of whether or not the system is under attack.

As used herein, a "snapshot" (or "snapshot object") is (or refers to) a collection of a set of values of cluster data items that correspond to a particular point in time. At some later time, a snapshot, or a series of snapshots can be applied to cluster's data state to recreate the set of values of the cluster's data items so as to correspond to the particular point in time of the snapshot.

One embodiment of the aforementioned special handling of snapshots is shown in the flow beginning at decision 113. Specifically, decision 113 serves to answer the question, "Is the operation on a snapshot?". If the answer is "No", then the "No" branch of decision 113 is taken and, at step 116, any one or more of any non-snapshot cluster operation handling policies are invoked. So long as the non-snapshot cluster operation handling policies are satisfied, then the operation is allowed. If the covering policy or policies are violated, then the operation is denied.

On the other hand, if the answer to the question "Is the operation on a snapshot?" is "Yes", then the "Yes" branch of decision 113 is taken and step 118 is invoked, which step serves to enforce MPA on the operation over the snapshot. It should be recognized that the foregoing operation over the snapshot can subsume any operation. For example, in addition to the operations of READ, WRITE, EXECUTE, DELETE, there may be additional operations that are specific to handling of snapshots. For example, one further operation might be RESTORE, where the semantics of a RESTORE operation onto a subject snapshot means to change data of the cluster to comport with the point-in-time data within the snapshot itself.

Now, after step 118 is invoked so as to enforce MPA on the subject operation over the subject snapshot, there may be any number of multi-party consensus protocol events. The mere fact that there are any number of multi-party consensus protocol events does not by itself mean that a consensus is reached. In fact, there are many tests that must pass before a consensus is deemed to have been reached. Some of such tests are shown and described as pertains to figures that follow. In any case, there is a test 119 that checks if a consensus has been reached. If so, the "Yes" branch of test 119 is taken and the subject operation over the subject snapshot is allowed. The subject operation over the subject snapshot is performed in due course. On the other hand, if the "No" branch of test 119 is taken, then the subject operation over the subject snapshot is denied.

As used herein, the term "consensus" refers to a number of candidate approvers who have indicated approval for a particular operation to be performed based on a request. In some cases, a majority consensus is reached when the number of candidate approvers who have indicated approval represents the majority of candidate approvers. In some cases, a unanimous consensus is reached when the number of candidate approvers who have indicated approval equals the number of candidate approvers. In some cases, consensus cannot be reached, such as when there is even one candidate approver who indicates a denial, rather than an approval. In exemplary cases, the set of candidate approvers does not include the user who raised the request. In some cases, the set of candidate approvers does not include the owner of a computer process that raised the request.

There are many possible ransomware thwarting scenarios. Consider a case where a production system is associated with a backup system (e.g., a backup system provided by a cloud computing vendor). Further consider that a particular version of a snapshot can be copied over from the production system to the backup system. In this case, a ransomware attack might be able to modify data items on the production system but might not be able to modify data items, including snapshots, of the backup system. Thus, in this scenario, upon identification of a possible ransomware attack on a particular snapshot stored on the production system, the possible ransomware attack can be thwarted by identifying a version of the snapshot that is not subject to the ransomware attack, specifically one of the snapshots of the backup system. Moreover, in this scenario, the multi-party authorization (MPA) consensus protocol serves to ensure that the correct snapshot (e.g., a particular one of the snapshots of the backup system) is to be used to restore certain of the data items of the production system. In some cases, the correct snapshot to be authorized might be deemed to be correct because it is a just prior version of the snapshot that was attacked, and as such has the most updated data state. In other cases, the correct snapshot to be authorized might be deemed to be correct because it is a different instance of the snapshot that was attacked.

Consider another scenario where a production system is associated with a backup system, and where the production system continuously produces snapshots (e.g., every hour, every minute, etc.), and where only periodically (e.g., once a day, once a week) a set of snapshots of the production system are copied to the backup system. Thwarting a ransomware attack in this scenario might be remediated differently than as discussed in the previous scenario. Specifically, since the production system stores multiple snapshots, there might be many snapshots stored on the production system, many of which good candidates for use in restoring the data state of the production system. In this scenario, the multi-party authorization (MPA) consensus protocol serves to ensure that the correct snapshot (e.g., a particular one of the snapshots of the production system) is to be used to restore certain of the data items of the production system. In some cases, the correct snapshot to be authorized might be deemed to be correct because it is a prior version that was produced just prior to the attack, and as such has the most updated data state that can be used for data state restoration.

Consider yet another scenario where, upon identifying a possible ransomware attack on a data item of the cluster, in response to the identification of the possible ransomware attack, the system identifies a snapshot that is not subject to the ransomware attack and thus can be used to restore the data state of the data item of the cluster that had been attacked.

As can be seen from consideration of the foregoing scenarios, a possible ransomware attack can be thwarted by identifying a version of the snapshot that is prior or different (e.g., a prior version or a different instance) snapshot that had not been modified by the ransomware attack.

Still further, consider the scenario where any proposed modification to a snapshot is subjected to a multi-party authorization (MPA) consensus protocol. This technique where any proposed modification to a snapshot is subjected to approval via multiple parties serves to ensure that any modification of a snapshot item by ransomware is thwarted. In many situations, it might not be possible to identify a ransomware process or agent as being distinct from a process or agent that is producing the snapshot for the very first time. Accordingly, the foregoing test, where any proposed modification to a snapshot becomes subjected to approval via multiple parties, might be carried out only on snapshot items that had been closed or otherwise marked as being henceforth immutable.

Returning to the discussion of decision 113 and, more specifically, when the "No" branch of decision 113 is taken, it might happen that there are multiple policies that cover a particular subject operation. Moreover, policy enforcement over any particular operation or data item might implicate data-specific permissions that govern handling of data items of the cluster. One possible embodiment of a permissions model and its relationship to policy enforcement is shown and described as pertains to FIG. 1B.

Figure 1B:
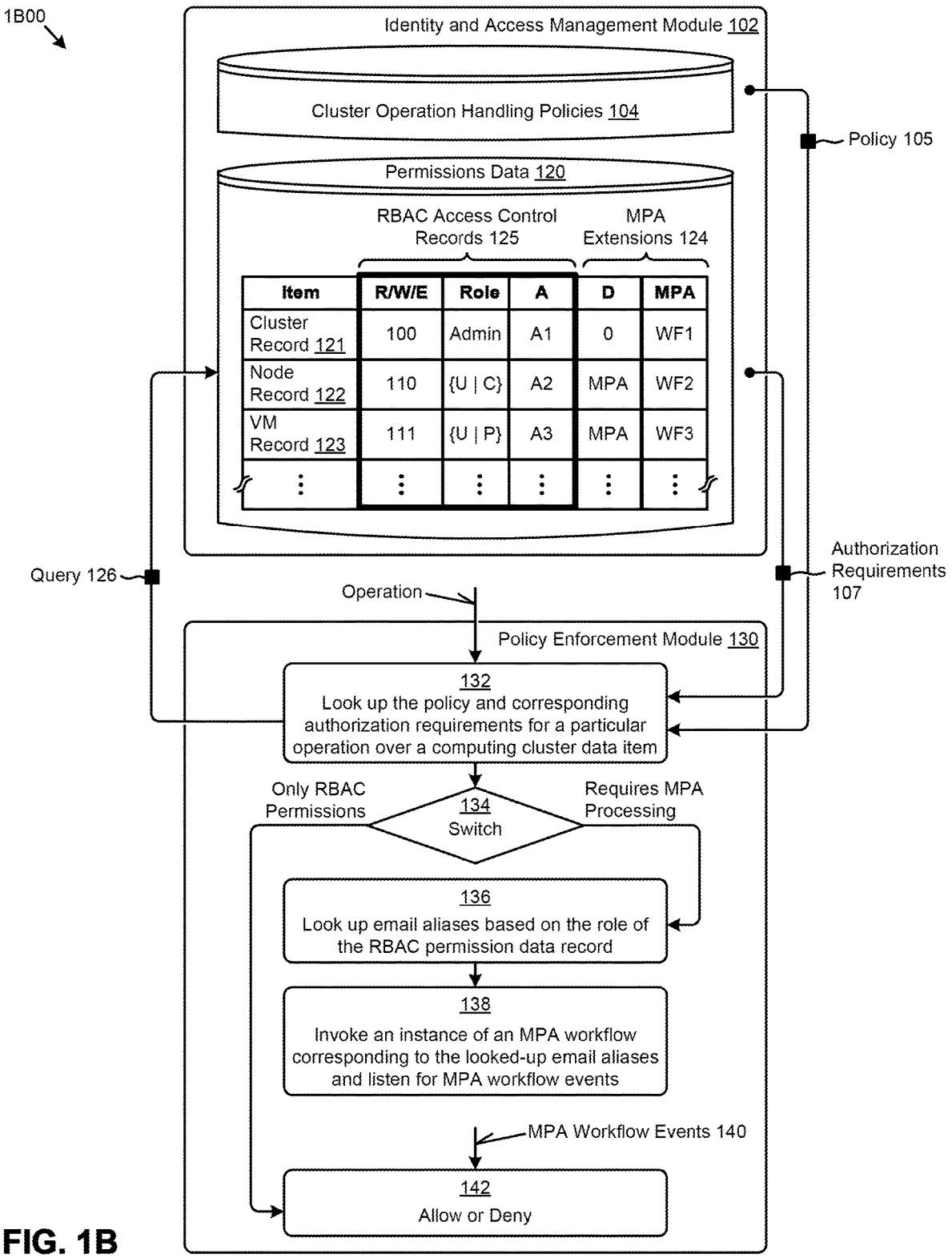
FIG. 1B shows a permissions model in a configuration that enforces use of a multi-party authorization consensus protocol to authorize operations over a computing cluster, according to an embodiment.

FIG. 1B shows a permissions model in a configuration that enforces use of a multi-party authorization consensus protocol to authorize operations over a computing cluster. As shown, a policy enforcement module can be integrated with an RBAC model for access management. As an option, one or more variations of configuration 1B00 and/or any aspect thereof may be implemented in the context of the architecture and functionality of the embodiments described herein and/or in any environment.

The figure is being presented to illustrate how permissions data 120 that implements RBAC access control records 125 can be extended to include MPA extensions 124. Moreover, the figure is being presented to illustrate how the MPA extensions can be used to facilitate policy enforcement. Specifically, and as shown, a policy enforcement module 130 is configured to emit a query 126 to an identity and access management module 102. Policy enforcement module 130 will proceed based on the results of the query. For example, the policy enforcement module might be informed by a policy 105 (e.g., as may be derived from the cluster operation handling policies 104) as well as authorization requirements 107 (e.g., as may be derived from permissions data 120). The policy, possibly by itself or possibly in conjunction with authorization requirements, define what actions need to be taken when allowing or denying an operation within the cluster.

In the particular embodiment of the policy enforcement module of FIG. 1B, step 132 commences by accessing whatever policies are applicable to the incoming operation and, based on the policy or policies, looking up corresponding authorization requirements 107. In some cases, only applicable RBAC permissions apply to the data item corresponding the operation, whereas in other cases, in addition to any applicable RBAC permissions that apply to the data item, there may be further processing needed in order to gain MPA consensus. Determination of which case of the foregoing is handled by switch 134. That is, in cases where only RBAC permissions apply to the data item corresponding the operation, the processing can immediately move to step 142 where the operation can be allowed or denied strictly on the basis of the RBAC permissions. In other cases, the operation will be allowed or denied based on not only the RBAC permissions, but also based on the results of MPA processing.

As is understood by those of ordinary skill in the art, in cases where only RBAC permissions apply to the data item corresponding to the operation, the processing can be accomplished within a very short period of time-possibly as little as a few tens or hundreds of microseconds. However, in cases where the operation will be allowed or denied based on not only the RBAC access control records, but also based on the results of MPA processing, it might take a long time, possibly many minutes to reach a consensus (or time out). Accordingly, some of the aforementioned MPA extensions 124 include a designation of one or more MPA workflows. This is shown as "WF1", "WF2", "WF3" etc. in the "MPA" column of the MPA extensions. Moreover, some of the aforementioned MPA extensions 124 include designation of a delete authorization. This is shown under the "D" column of aforementioned MPA extensions 124. As shown, a particular item of data (e.g., cluster record 121, node record 122, VM record 123, etc.) is associated with its assigned set of RBAC access control records as well as its assigned set of MPA extensions.

The RBAC access control record for any data item might include (1) a designation of binary flags (e.g., "100", "110", "111" etc.) corresponding to READ/WRITE/EXECUTE, (2) a designation of a "Role" (e.g., "Admin", "User", etc.), as well as any other attributes (e.g., attribute "A1", attribute "A2", attribute "A3", etc.). Further the "Role" field of an RBAC access control record might codify any sets of roles such that, so long as a particular requestor that is requesting performance of an operation over the cluster belongs to or is associated with at least one of those roles, the performance of that operation would not be denied on the basis of that particular requestor's role association. On the other hand, if a particular requestor that is requesting performance of an operation over the cluster does not belong to or is not associated with at least one of those roles, the performance of that operation would be denied merely on the basis that the requesting user does not belong to or is not associated with any of those roles.

The semantics of entries in the "Role" can include logic such that logical roles can be codified using Boolean logic operators. For example, the role field entry shown as "{U|C}" carries the semantics that, so long as the requestor is a member of either the "U" role group (e.g., user) or the "C" role group (e.g., cloud administrator or cloud agent), processing will advance. On the other hand, if the requestor is neither a member of the "U" role group nor the "C" role group, then the request will be denied.

Now, returning to the discussion of switch 134, in the situation where switch 134 determines that a particular operation requires MPA processing, then processing within the policy enforcement module moves to step 136 where email aliases or other contact information is looked-up. Such lookups can be based, at least in part, on the role designation as given in RBAC access control records 125 that correspond to the subject operation or data item. Having assembled the foregoing email aliases or other contact information, an instance of an MPA workflow (e.g., "WF1", "WF2", "WF3" etc.) is invoked (step 138). The workflow(s) commence, and various MPA workflow events 140 are collected. At some moment in time, step 142 has sufficient information (e.g., workflow events that correspond to an authorization, or workflow events that correspond to a timeout condition) to make an allow determination or a deny determination.

Making the foregoing allow determination or deny determination relies in part on how the authorization system is set up, and how it operates on an ongoing basis. One possible embodiment of such setup operations and one possible embodiment of such ongoing operations are shown and described as pertains to FIG. 2A.

Figure 2A:
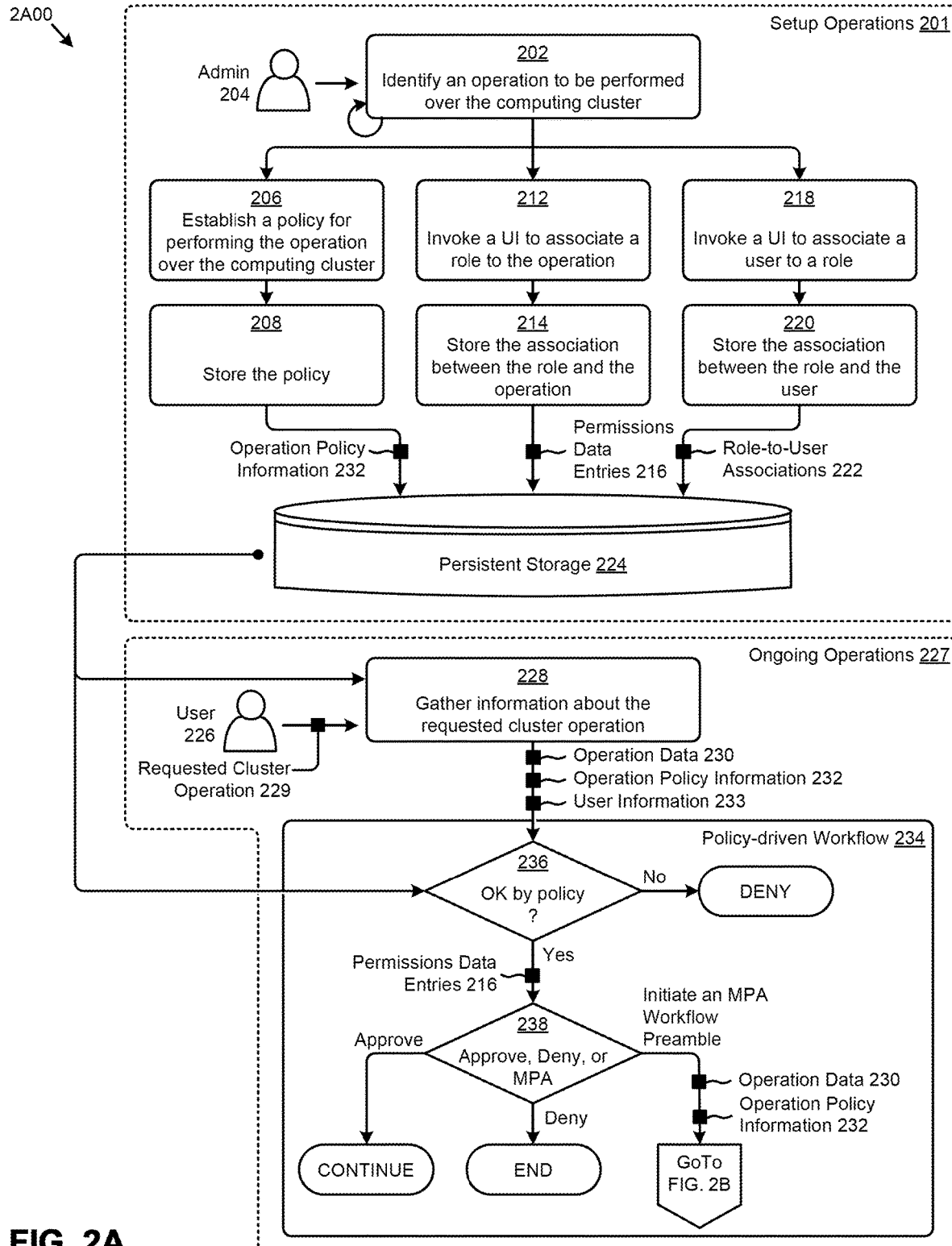
FIG. 2A depicts example embodiments that show setup operations and ongoing operations that are used for policy-informed enforcement of multi-party authorizations within an identity and access management regime, according to an embodiment.

FIG. 2A depicts example embodiments that show (1) setup operations and (2) ongoing operations that are used for policy-informed enforcement of multi-party authorizations within an identity and access management regime. As an option, one or more variations of the example embodiments 2A00 or any aspect thereof may be implemented in the context of the architecture and functionality of the embodiments described herein and/or in any environment.

The figure is being presented to illustrate how cluster operations can be associated with (1) one or more policies, (2) one or more roles, and (3) user information pertaining to those who are assigned in the role. Further, the figure shows that policies, roles and user information pertaining to those who are assigned in the role can be defined, correlated, and persistently stored (e.g., in persistent storage 224) so as to be retrievable by ongoing operations. The figure depicts setup operations 201 as well as ongoing operations 227.

As shown, the setup operations 201 include multiple fork blocks that begin upon identification of a particular operation (step 202) that could, at least potentially, be performed on the computing cluster. In some cases, an administrator 204 might identify many operations that could, at least potentially, be performed on the computing cluster. For example, an administrator might want to specify how any one or more of a cluster record, a node record, a VM record, or other particular record types should be handled in the event of occurrence of a request to operate on such a record. The admin can do so by (1) permitting or denying the operation based on a covering policy, (2) permitting or denying the operation based on the role of a requestor, or (3) requiring a specific person or persons to be consulted before permitting or denying the operation.

When an administrator is positioned to codify any or all of the foregoing policies, role-based permissions and/or specific user requirements, then the administrator can (1) establish a policy for performing the subject operation (step 206), (2) associate a role to the subject operation (step 212) and (3) associate a particular user or person or persons to a role (step 218).

Once codified in a manner that facilitates storage, subsequent retrieval, and interpretation, steps can be taken to store the policy or policies (step 208), store the association or associations of a role to a corresponding operation (step 214), and store the association or associations of a particular user or person or persons to a role or roles (step 220). More particularly, and as shown, the policy or policies can be stored into persistent storage 224 as operation policy information 232, the association of a role to a subject operation can be stored as permissions data entries 216, and the association or associations of a particular user or person or persons to a role or roles can be saved as role-to-user associations 222. Any aspect of the policies (e.g., associations to persons or roles, timeout values, number of approvers needed, method of reaching consensus, etc.) can be codified in a computer-readable format and persisted into persistent storage 224. Strictly as examples, policy requirements, policy associations, policy values and/or policy options can be stored in one or more computer-readable formats. In some cases, policy information can specify individual values and/or ranges of values, etc. In some cases, policy information and/or the policy itself can be captured in computer code that implements an algorithm.

Now, having completed setup operations 201, the system is in a state such that when a requested cluster operation 229 is received, (e.g., from user 226), steps of the shown ongoing operations 227 are taken such that the requested operation is performed subject to adherence to a policy. More particularly, in order to enforce that a particular requested operation is performed subject to adherence to a corresponding policy, a policy-driven workflow 234 is entered. As shown, the policy-driven workflow is informed by all or portions of the operation policy information 232 that corresponds to the requested operation, plus any operation data 230 that corresponds to the requested operation, plus any user information 233 (e.g., username and/or email alias, and/or phone number, etc.) that may be provided. Such information can be gathered (step 228) via one or more accesses to persistent storage 224. When all or portions of such information has been gathered, policy-driven workflow 234 is entered. In some cases, the requested cluster operation can be immediately denied on the basis of the policy. This is shown by the "No" branch of decision 236. For example, a policy might exist that disallows a guest user of the computing cluster to make any WRITE changes to cluster data. Accordingly, in the situation where a guest user attempts to make a WRITE change to cluster data, user information 233 (e.g., that the requesting user is a guest) in combination with the operation policy information 232 (e.g., the policy covering denial of WRITE operations by a guest user) is sufficient to take the "No" branch of decision 236.

In cases where the requested cluster operation cannot be immediately denied on the basis of the policy, then the policy-driven workflow proceeds to three-way decision 238 that is further informed by one or more of the permissions data entries 216 such that one of the three branches is taken. To explain, consider a case where a user who is not an administrator attempts to change a cluster record (e.g., cluster record 121 of FIG. 1). When processing reaches decision 238, it can be determined from the combination of user information 233 (e.g., that the requesting user is not an administrator) and permissions data entries 216 (e.g., the cluster record 121 of FIG. 1B) that, at least since the requesting user is not an administrator, that the request is to be denied. Thus, the "Deny" branch of three-way decision 238 is taken.

Alternatively, consider a case where a user who is an administrator attempts to change a cluster record (e.g., cluster record 121 of FIG. 1). When processing reaches decision 238, it can be determined from the combination of user information 233 (e.g., that the requesting user is an administrator) and permissions data entries 216 (e.g., the cluster record 121 of FIG. 1B) that, (1) since the requesting user is an administrator, and (2) since the cluster record (e.g., cluster record 121 of FIG. 1B) requires MPA processing using "WF1", the request is to be subjected to MPA. The "Initiate an MPA Workflow Preamble" branch of three-way decision 238 is taken and processing is transferred to an entry point of an MPA workflow preamble, which performs further processing that needs to be performed before approving the requested operation. Such an entry point of an MPA workflow preamble is shown and described as pertains to FIG. 2B.

Figure 2B:
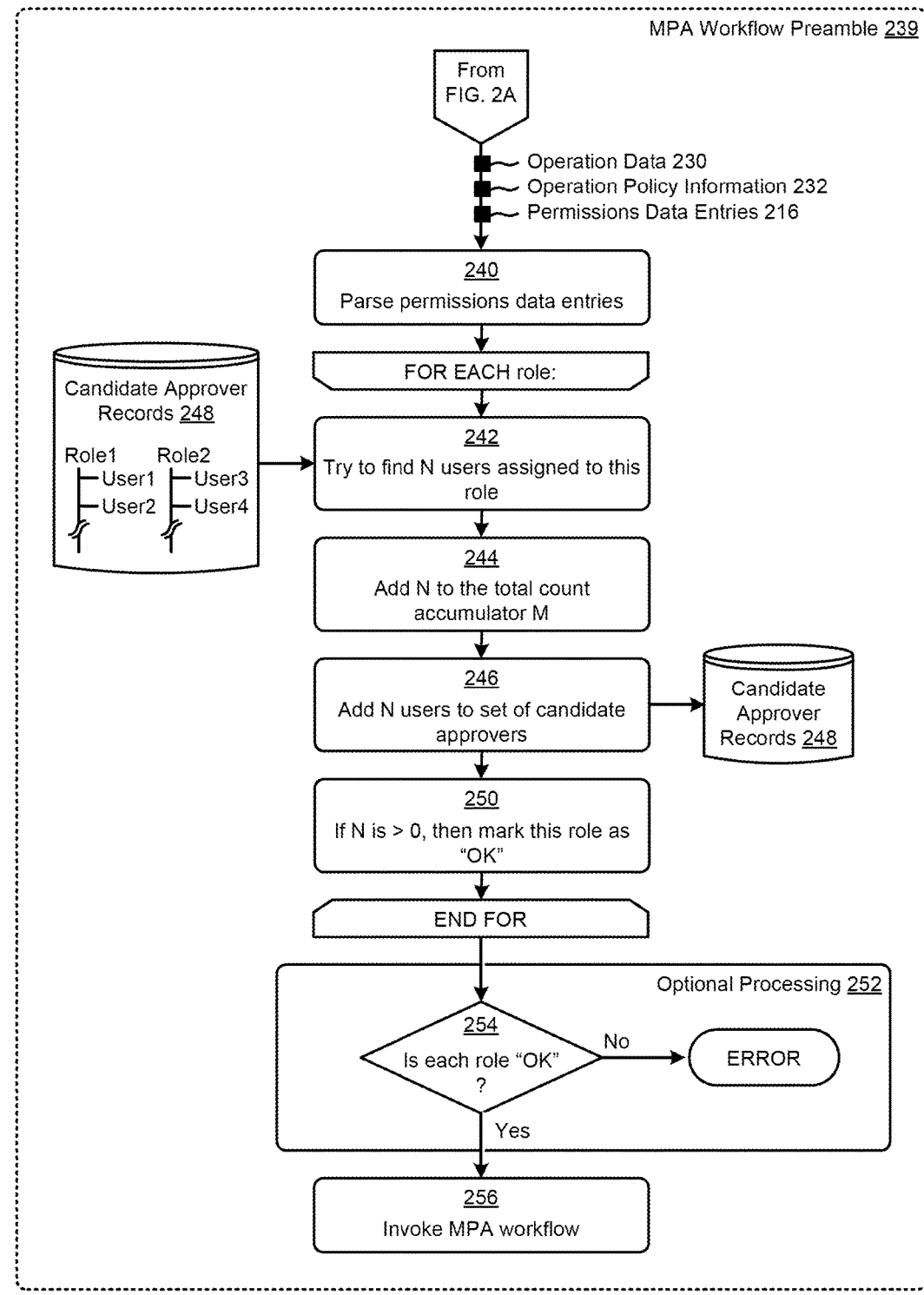
FIG. 2B depicts an initial portion of multi-party authorization processing, according to an embodiment.

FIG. 2B depicts an initial portion of multi-party authorization processing. As an option, one or more variations of initial portion of multi-party authorization processing 2B00 or any aspect thereof may be implemented in the context of the architecture and functionality of the embodiments described herein and/or in any environment.

The figure is being presented to illustrate how permissions data entries that include an MPA designation can be processed so as to identify a minimum set of approvers who must reach consensus in order for the requested operation to be allowed. Further, the shown flow covers implementations where at least one authorized approver from each of the roles is required. The shown flow is merely one possible implementation.

The shown flow, and more particularly certain of the steps of the shown flow operate to access (1) a list of approvers per operation, user information (e.g., role, name, user ID, email alias, et.), (2) a canonical definition of consensus (e.g., a minimum number of approvers required, a numeric or ratio-wise definition of consensus, etc.), (3) a security code validity time window, (4) a decision request timeout, (5) a default approver list (e.g., containing designation of a primary set of approvers, a secondary set of delegate approvers, etc.), and/or (6) a policy enable/disable indication that specifies the conditions under which a multi-party authorization workflow will be invoked. Additionally, a further permission/operation designation that carries the semantics of 'Configure Multi Party Authorization' is defined and associated with corresponding operations (e.g., via specification of application programming interface (API) entry points, uniform resource identifier (URI) or uniform resource locator (URL) endpoints, etc. In some cases certain CREATE, READ, UPDATE, DELETE (CRUD) operations are temporarily granted the super user role.

It should be noted that once a multi-party authorization requirement is enabled over any particular operation or data item, the multi-party authorization requirement can't be disabled except as provided hereunder. Actions taken and determinations made in accordance with the foregoing setup and configuration steps can be integrated a cluster-wide messaging system. Such a messaging system can be used to advise client teams (1) that an MPA workflow has been invoked, (2) that required number of approvals/denials have been received and the operation can be retriggered for MPA, (3) that the MPA workflow has timed out, etc.)

In accordance with the foregoing, and in the particular embodiment shown, the MPA workflow preamble 239 is provided information about the requested operation (e.g., operation data 230), information pertaining to the policy that covers the requested operation (e.g., operation policy information 232), and permissions data (e.g., one or more permissions data entries 216, or pointer thereto). Step 240 serves to parse the permissions data so as to isolate a role field entry of the permissions data. A FOR EACH loop is entered such that, for each role, a number "N" approvers is sought (step 242). Such approvers can be retrieved from a repository of role-to-user associations 222. In certain embodiments, a given role-to-user association includes sufficient information about a particular user so that the user can be contacted (e.g., via an email alias, or via a phone number, or via a handle, etc.). In other embodiments, role and/or user information is used, singly or in combination to retrieve contact information for a particular user, and such retrieved contact information can in turn be used by an MPA workflow.

At step 244, "N" approvers that were actually identified (step 242) is added to an accumulator "M". The number "N" can be defined such that a consensus can be reached even if the assumption is made that the authentication credentials for at least one of the approvers has been misappropriated (e.g., permitting a malicious actor to pose as a user or administrator). At step 246, information pertaining to the "N" users (if any) is added to a set of candidate approver records 248.

Candidate approver records contain at least a sufficiency of information such that further processing pertaining to the particular approver can be performed. Strictly as an example, a candidate approver record may include an email alias for the candidate approver. Additionally or alternatively, and again, strictly as an example, a candidate approver record might include a sufficiency of information (e.g., a user id) such that a further corpus of information (e.g., a user directory such as an ACTIVE DIRECTORY™ can be accessed directly or indirectly (e.g., via an API or protocol such as LIGHTWEIGHT DIRECTORY ACCESS PROTOCOL™ (LDAP)) in order to gather further contact information for the particular candidate approver.

Continuing through the next step in this FOR EACH loop, if there were indeed a non-zero number of candidate approvers that were found in the role-to-user associations 222 (e.g., as a result of execution of step 242), then the role corresponding to this iteration through the FOR EACH loop is marked as "OK" (step 250). This is because, in some embodiments, consensus is defined as having at least one affirmative approval from at least one candidate approver in each of the roles. In some situations, consensus is defined as having an affirmative approval from majority of candidate approvers drawn from a set of candidate approvers that does not include the requestor. This to thwart a ransomware attack where the requestor is the malicious actor or a malicious agent.

A decision corresponding to the foregoing can be carried out by test 254, which is shown within optional processing 252. More specifically, if the system is indeed operating in a regime such that consensus is defined as having at least one affirmative approval from at least one candidate approver in each of the roles, and if this condition is not met, then the "No" branch of test 254 is taken and an error is emitted. On the other hand, if there is at least one candidate approver from each of the roles, or if the system is configured so as to not require at least one affirmative approval from each of the roles, then if the condition that each role is marked "OK" is satisfied, then the "Yes" branch of test 254 is taken and processing proceeds to invoke an MPA workflow (step 256).

Systems such as herein-disclosed may be configured with a plurality of different multi-party authorization workflows (e.g., the foregoing MPA workflow "WF1", MPA workflow "WF2", MPA workflow "WF3", etc.), where each one of the different multi-party authorization workflows corresponds to operational variations of a given multi-party authorization protocol. An example of a multi-party authorization workflow is shown and described as pertains to FIG. 3.

Figure 3:
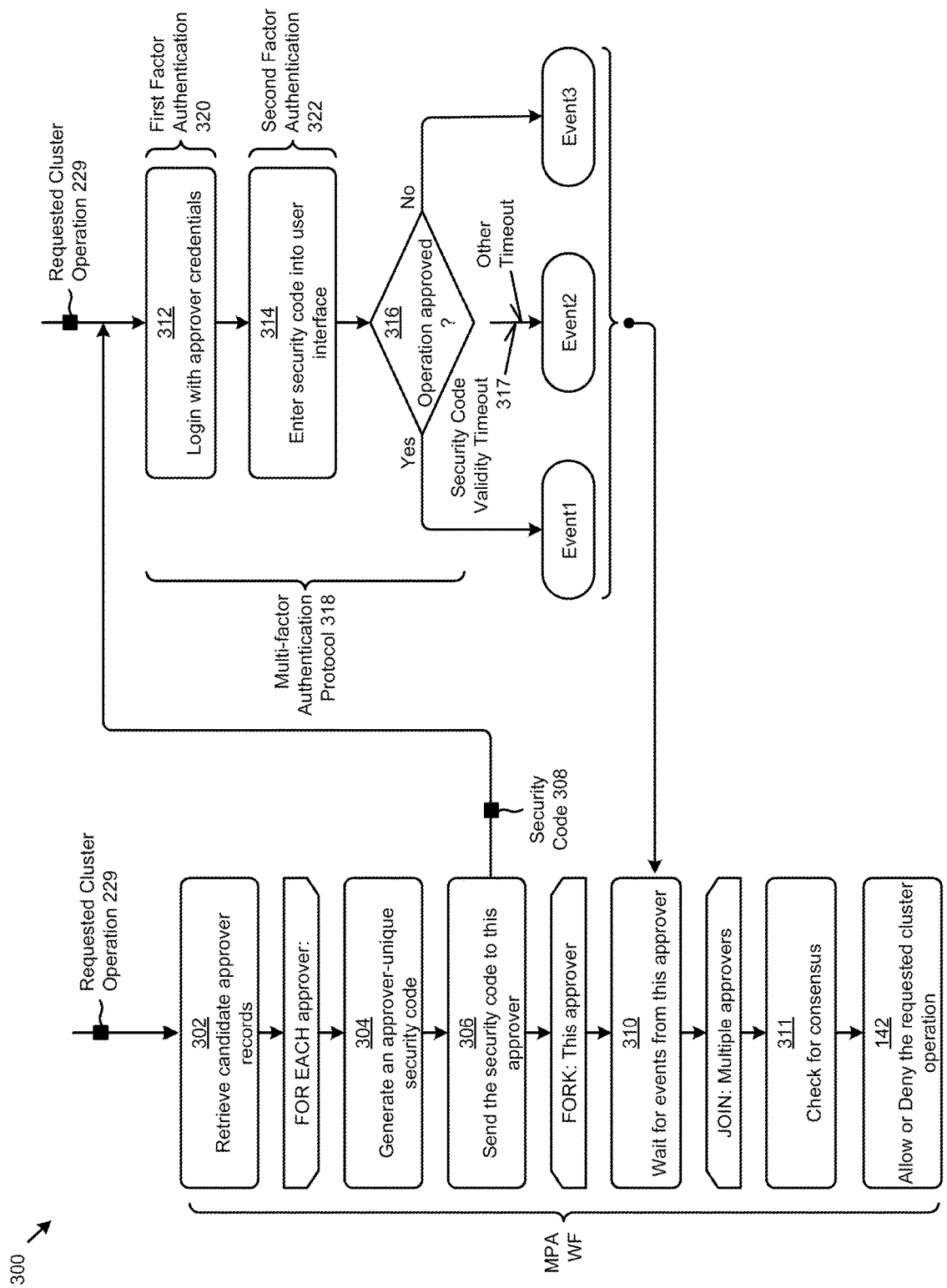
FIG. 3 shows a multi-party authorization workflow as used in systems that implement secure, multi-party authorizations within an identity and access management regime, according to an embodiment.

FIG. 3 shows a multi-party authorization workflow as used in systems that implement secure, multi-party authorizations within an identity and access management regime. As an option, one or more variations of multi-party authorization workflow 300 or any aspect thereof may be implemented in the context of the architecture and functionality of the embodiments described herein and/or in any environment.

The figure is being presented to illustrate how a consensus of approvals can be reached by contacting multiple candidate approvers and then by collecting affirmative approval events and/or by collecting denial events and/or by collecting timeout events.

The particular embodiment of this FIG. 3 is one where approver-unique security codes are generated, one for each candidate approver (e.g., as shown in the left side of FIG. 3). Further, the particular embodiment of this FIG. 3 is one where the aforementioned security code is used to implement a multi-factor authentication in the context of multi-party authorization.

As discussed heretofore, there are certain particular operations (e.g., ransomware-implemented operations) that are potentially damaging to the cluster. As such, those certain particular operations might need to be subjected to security procedures (e.g., multi-party authorizations, multi-party approvals) that confirm the identity of a candidate approver as well as determine a consensus (or lack of consensus).

One possible mechanism for securely obtaining multi-party consensus is depicted by the "MPA WF" (multi-party authorization workflow) as shown on the left side of FIG. 3. This particular multi-party authorization workflow has the characteristic that in order to produce an affirmative authorization, a candidate approver must first be authenticated. As such, after retrieving candidate approver records (step 302), then a FOR EACH loop is entered to iterate through candidate approvers (e.g., the candidate approver records 248 of FIG. 2B). In each iteration an approver-unique security code is generated (step 304) for each particular candidate approver. The approver-unique security code (e.g., security code 308) is sent to the corresponding candidate approver (step 306) in a manner such that the particular candidate approver can use the approver-unique security code in a multi-factor authentication protocol.

In each iteration through the FOR EACH loop, an approver-specific process is forked off. Multiple of such approver-specific processes can be joined based on receipt of specific types of events that are raised by the multi-factor authentication protocol. This is shown by the FORK/JOIN block in which step 310 serves to wait for events from the particular approver.

It can happen that at least some of the candidate approvers may not be able to carry out the shown multi-factor authentication protocol 318. This can happen for many reasons. As examples, a particular candidate approver may not be available to carry out the shown multi-factor authentication protocol. Or, a particular candidate approver may fail to satisfy either the shown first factor authentication 320 and/or the second factor authentication 322. It can also happen that a particular requested cluster operation is not approved by a particular candidate approver. Accordingly, decision 316 serves to determine if the operation (e.g., the shown requested cluster operation 229) is deemed to be approved, in which case the "Yes" branch of decision 316 is taken and an event of type "Event1" is raised. On the other hand, if decision 316 determines that the operation is not approved by this candidate approver, then the "No" branch of decision 316 is taken and an event of type "Event3" is raised. It is also possible that one or more timers have timed out (e.g., security code validity timeout 317 or other timeout), in which case an event of type "Event2" is raised.

Returning again to the discussion of step 310, during the processing of the multi-factor authentication protocol 318 (e.g., in accordance with step 312, step 314, and/or decision 316) there will be some moment when actual or default responses (e.g., non-affirmative responses due to timeout) are received from all candidate approvers. In this embodiment, when all actual affirmative or non-affirmative or default responses have been received from all candidate approvers, step 311 is entered to check for consensus. In this embodiment, default events (e.g., timeout events) are ignored, and consensus is reached when all of the actual responses are the same. In other embodiments, consensus is reached when more than half of the number of approvers have provided the same responses (e.g., all affirmative or all non-affirmative). In any of such embodiments, when consensus is reached, processing proceeds to step 142, where, based on an affirmative consensus, the requested cluster operation is allowed, or based on a lack of an affirmative consensus, the requested cluster operation is denied.

Many alternative embodiments execute an MPA protocol post-amble that emits status indications based on the results of step 311 and/or based on the results of step 142. Strictly as one example, a status indication (e.g., approved or denied operation) might be sent to all of the approvers. The specific requirements (e.g., manner of calculating consensus) and/or specific options (e.g., to emit status indications) can correspond to specific variations of a given multi-party authorization consensus protocol. In some embodiments, a particular multi-party authorization protocol and/or variations thereto are codified in a multi-party authorization workflow object. As such, the multi-party authorization workflow object contains information that could be a target for a ransomware process. Changes to a multi-party authorization workflow object are handled specially so as to thwart ransomware-induced or other malicious attempts to change the data codified in a multi-party authorization workflow object.

Figure 4A:
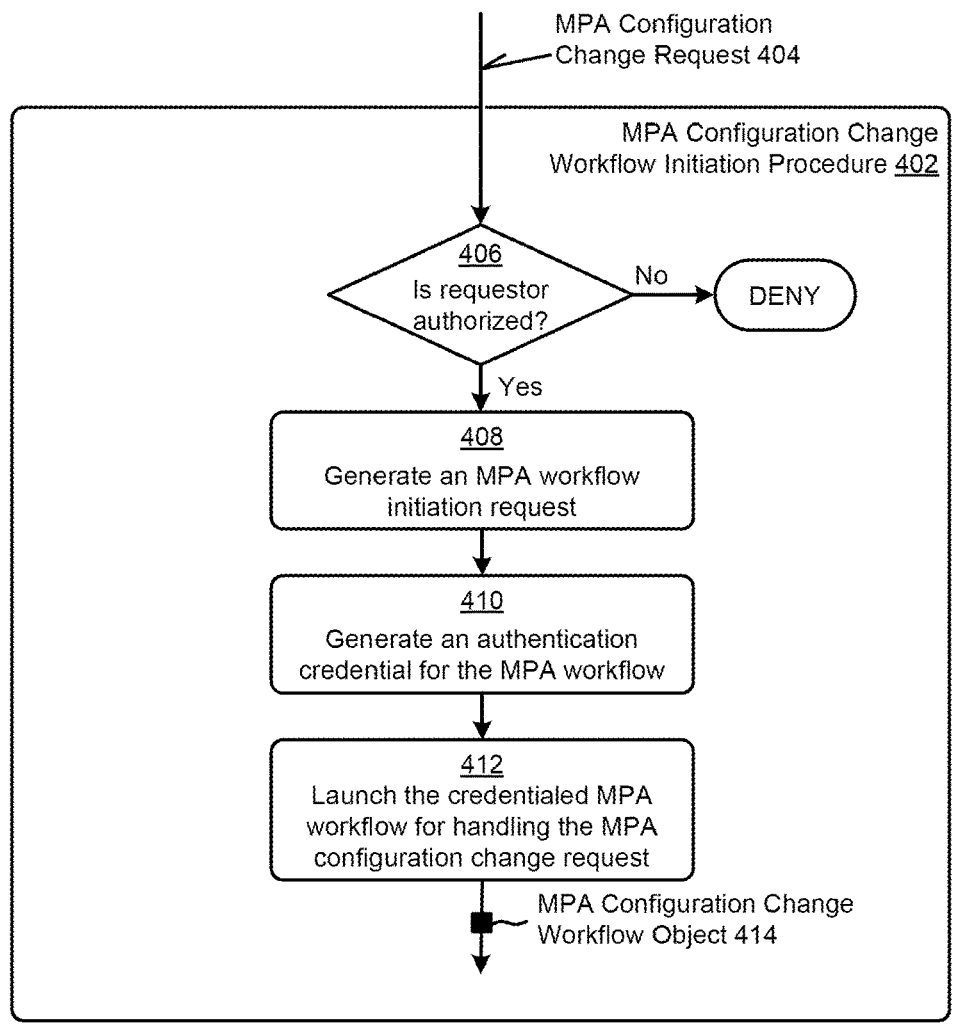
FIG. 4A shows a multi-party authorization policy configuration workflow initiation flow as used in systems that implement secure, multi-party authorizations within an identity and access management regime, according to an embodiment.

FIG. 4A shows a multi-party authorization policy configuration workflow initiation flow as used in systems that implement secure, multi-party authorizations within an identity and access management regime. As an option, one or more variations of multi-party authorization policy configuration workflow initiation flow 4A00 or any aspect thereof may be implemented in the context of the architecture and functionality of the embodiments described herein and/or in any environment.

The figure is being presented to illustrate how a multi-party authorization configuration change workflow object can be generated. Such a multi-party authorization configuration change workflow object 414 can comprise all manner of authentications and authorizations as may be used during the course of processing a multi-party authorization policy configuration. Specifically FIG. 4A implements a first portion of MPA workflow object processing 416 that, as shown, commences upon receipt of an MPA configuration change request (e.g., as depicted by MPA configuration change workflow object 414). The MPA processing serves to thwart ransomware-induced or other malicious attempts to change to the MPA configuration. The shown decisions and steps comprise an MPA configuration change workflow initiation procedure 402.

As shown, when an MPA configuration change request 404 is received into the MPA configuration change workflow initiation procedure (e.g., at decision 406), a first check to see if the requestor is authorized to raise such a change request is carried out. If not, the "No" branch of decision 406 is taken and the change request is immediately denied.

Otherwise, the "Yes" branch of decision 406 is taken and a request to initiate an MPA workflow is generated (step 408). In this embodiment, an authentication credential (e.g., a digitally-signed credential) is generated (step 410) and a workflow for handling an MPA configuration change is invoked (step 412). In this and other embodiments, an MPA configuration change workflow object 414 is codified and made available to the invoked instance of an MPA configuration change workflow.

Since making a change to any policy or workflow or data record pertaining to how a consensus protocol can be carried out can have disastrous consequences to the cluster, a special MPA configuration change approval technique is defined. One possible implementation of such an MPA configuration change approval technique is shown and described as pertains to FIG. 4B1.

FIG. 4B1 exemplifies an MPA configuration change approver enumeration technique as used in systems that implement secure, multi-party authorizations within an identity and access management regime. As an option, one or more variations of approver enumeration technique 4B100 or any aspect thereof may be implemented in the context of the architecture and functionality of the embodiments described herein and/or in any environment.

The figure is being presented to illustrate how a workflow to make a change to an MPA configuration (e.g., an MPA policy or an MPA workflow or an MPA data record, or any aspect thereof) can be configured to identify particularly authorized approvers. More specifically, such particularly authorized approvers can be looked-up from a secure repository (e.g., from the shown secure storage 443).

Workflows that operate over a requested MPA configuration change can operate autonomously as operational agents in the cluster. The computer code that comprises the workflow can itself be authenticated. Moreover, any data item that is taken in as an input to the MPA configuration change workflow can be authenticated. As shown, MPA configuration change workflow object 414 is authenticated at step 420. If the authentication is not successful, the "No" branch of test 422 is taken and the workflow processing ends. In the other hand, if the authentication is successful, then the "Yes" branch of test 422 is taken and the workflow proceeds to step 424 at which point secure storage 443 is accessed to locate a set of MPA configuration change approvers, which MPA configuration change approvers 425 are specifically vetted so as to be trusted to approve MPA change requests. Such a list can be codified into a storable data item, and securely stored using any known techniques.

Based on the constituency of the aforementioned set of MPA configuration change approvers, a FOR EACH loop is entered. An approver-unique security code is generated (step 426) and the security code is securely delivered (step 428) to the approvers along with a request for their individual approvals. The security code can be securely delivered to the approvers using email, phone messaging (e.g., short message service (SMS)), and/or any known technique.

All, some, or none of the approvers might respond to the foregoing request for their individual approvals. Approver-specific replies to the MPA configuration change request can be captured asynchronously (e.g., based on the different timings of different approvers to respond with their replies). One way to capture such replies and advance the workflow is shown and discussed as pertains to FIG. 4B2.

FIG. 4B2 exemplifies an approver-specific request handling technique as used in systems that implement secure, multi-party authorizations within an identity and access management regime. As an option, one or more variations of approver-specific request handling technique 4B200 or any aspect thereof may be implemented in the context of the architecture and functionality of the embodiments described herein and/or in any environment.

The figure is being presented to illustrate one possible embodiment that captures approver-specific replies to the MPA configuration change request. The shown second portion of MPA workflow object processing 429 commences upon receipt of an approver-specific reply 430, and ends upon emission of a populated MPA configuration change workflow object 414.

Step 432 is invoked upon receipt of an approver-specific reply 430. Step 432 authenticates the approver-specific reply by performing or confirming the reply (e.g., via a challenge or via requiring a digital signature). Assuming the authentication is successful, then step 434 serves to populate an instance of an MPA configuration change workflow object 414. In some cases, an MPA configuration change workflow object can contain authentication information for multiple approvers. More specifically, such an MPA configuration change workflow object can contain approver-specific answers to the request for approval as well as a digital signature, etc.

There are many ways for a malicious actor to gain the rights of an administrator or other authorized person. In fact, it sometimes happens that a malicious actor can pose as an administrator or other authorized person without detection (e.g., by misappropriating the administrator's or other authorized person's authentication credentials). As such, the nature of any requested change to an MPA configuration as well as a secure verification of a consensus is needed. Strictly as examples, technique for verification of a requested change to an MPA configuration as well as a technique for verification of a consensus is shown and described as pertains to FIG. 4C1 and FIG. 4C2.

FIG. 4C1 exemplifies a configuration change instruction object generation technique as used in systems that implement secure, multi-party authorizations within an identity and access management regime. As an option, one or more variations of configuration change instruction object generation technique 4C100 or any aspect thereof may be implemented in the context of the architecture and functionality of the embodiments described herein and/or in any environment.

The figure is being presented to illustrate how an instruction object can be digitally signed before passing to downstream processing. More specifically, the figure is being presented to illustrate a third portion of MPA workflow object processing 435, where, in accordance with said MPA workflow object processing, even if a malicious actor and/or malicious software (e.g., ransomware) had been able to misappropriate the administrator's or other authorized person's authentication credentials, malicious actions of a such a malicious actor and/or malicious actions of malicious software can nevertheless be thwarted.

The shown flow commences upon receipt of an MPA configuration change workflow object 414. Such an MPA configuration change workflow object might have been populated by the technique of FIG. 4B2, or such an MPA configuration change workflow object might have been populated by any other means.

In the specific embodiment of FIG. 4C1, MPA configuration change workflow object contains all or portions of the originating MPA configuration change request 404, an answer 440 from an authorizer, a digital signature 444, and a security code. In some cases the security code (e.g., code 442) is used to implement a second factor in a multi-factor authentication protocol.

The flow progresses through several tests. A first test 446 asks if the answer 440 can be deemed to be an affirmative response. If not, the "No" branch of test 446 is taken and the workflow enters a wait state. A second test 448 asks if the submitter of the MPA configuration change workflow request has sufficient MPA configuration change rights. If not, the "No" branch of test 448 is taken and the workflow enters a wait state. This serves to thwart attempts where malware generates an MPA configuration change workflow request, yet the submitter is not one of the MPA configuration change approvers drawn from secure storage. Next, at step 450, code 442 and signature 444 are verified. If the security code and signature cannot be verified, then the "No" branch of test 450 is taken and the workflow enters a wait state. In this situation, even if the security code and/or signature of a particular one or more of the candidate authorizers cannot be verified, it is still possible that the MPA configuration change can be authorized due to consensus by a sufficient number of configuration change approvers who answer affirmatively to allow the requested MPA configuration change.

Assuming the "Yes" branches of all of test 446, test 448, and test 450 are taken, step 452 is entered to securely store the populated and verified MPA configuration change workflow object 456 into secure storage 443. This secure storage will be accessed in a later portion of the protocol, and reverified prior to making the requested change to the MPA configuration. Now, since at least one more approver has answered, the number of approvers can be incremented (step 458). This count is used in order to determine if a consensus has been reached. In this embodiment, a check 460 is entered immediately after incrementing the count. Check 460 serves to consider if the then-current count of approvers is greater than or equal to the number of approvers needed for consensus. If not, the "No" branch of check 460 is taken and a wait state is entered. Otherwise, if the count is greater than or equal to the number of approvers needed for consensus, then the "Yes" branch of check 460 is taken and step 464 operates to digitally sign an instruction object 436. Such an instruction object 436 may include multiple MPA configuration change approvals (MPA configuration change approval 4701, MPA configuration change approval 4702).

It should be noted that step 462 may be entered, multiple times based on multiple approval/denial events, and as such, there may be a long period of time between when a code 442 and/or a digital signature 444 is generated. To avoid the possibility a malaprop who is posing as an authorized user, has cracked a code or has modified configuration change rights, a series of re-verifications, all of which must pass, are performed in a further portion of MPA workflow object processing. Such a further portion of the MPA workflow object processing is shown and described as pertains to FIG. 4C2.

FIG. 4C2 exemplifies a configuration change verification and consensus verification technique as used in systems that implement secure, multi-party authorizations within an identity and access management regime. As an option, one or more variations of configuration change verification and consensus verification technique 4C200 or any aspect thereof may be implemented in the context of the architecture and functionality of the embodiments described herein and/or in any environment.

The figure is being presented to illustrate a final phase of the MPA configuration change workflow. Specifically, the figure is being presented to illustrate a fourth portion of MPA workflow object processing, which processing includes final authentications, and final verifications that take place prior to making a determination of consensus and before performing the requested MPA configuration change.

As shown, the fourth portion of MPA workflow object processing 472 is entered upon receipt or access to an instruction object 436. The authenticity of such an instruction object is checked (step 476). If authenticity cannot be verified, then the "No" branch of test 478 is taken and the change is denied. On the other hand, if the authenticity of such an instruction object is verified, then the "Yes" branch of test 478 is taken and processing advances to step 479 where all change approval signatures are rechecked. The shown decision 481 checks that all change approval signatures are authentic, and if not, the "No" branch of decision 481 is taken and the requested MPA configuration change is denied. On the other hand, if all change approval signatures are deemed authentic, then the "Yes" Branch of decision 481 is taken and decision 483 is entered. Decision 483 applies any one or more consensus rules, which rules are specific to the definition of consensus when the consensus is specific to an MPA change request. If consensus is not reached, then the "No" branch of decision 483 is taken and the change request is denied. If, on the other hand, after the rules have been applied and consensus is deemed to have been reached, then the "Yes" branch of decision 483 is taken and the change is performed (step 485). As can be seen from the foregoing, when a request to perform a change to a multi-party authorization policy record is raised, the multi-party authorization (MPA) protocol that is then in force is invoked. Enforcing the multi-party authorization (MPA) protocol that is then in force prevents a spoofing malaprop (or computing agent therefrom) from changing the multi-party authorization policy record (e.g., which record controls whether or not a particular operation over particular data items of the computing cluster is intended to be subject to a multi-party authorization protocol). That is, if it were possible for a malaprop to change the multi-party authorization policy record to reflect or correspond to a lower degree of security, then the undesired fact would follow that the malaprop could take advantage of the lowered degree of security, and thereby perform malicious acts.

It can now be understood that the foregoing multi-party authorization protocol can be applied to any operation or data item of the computing cluster. In modern computing clusters, there are many scenarios where operations involving snapshots or snapshot data items would need to be authorized by multiple approvers. Such a scenario is shown and described as pertains to FIG. 4D.

Figure 4D:
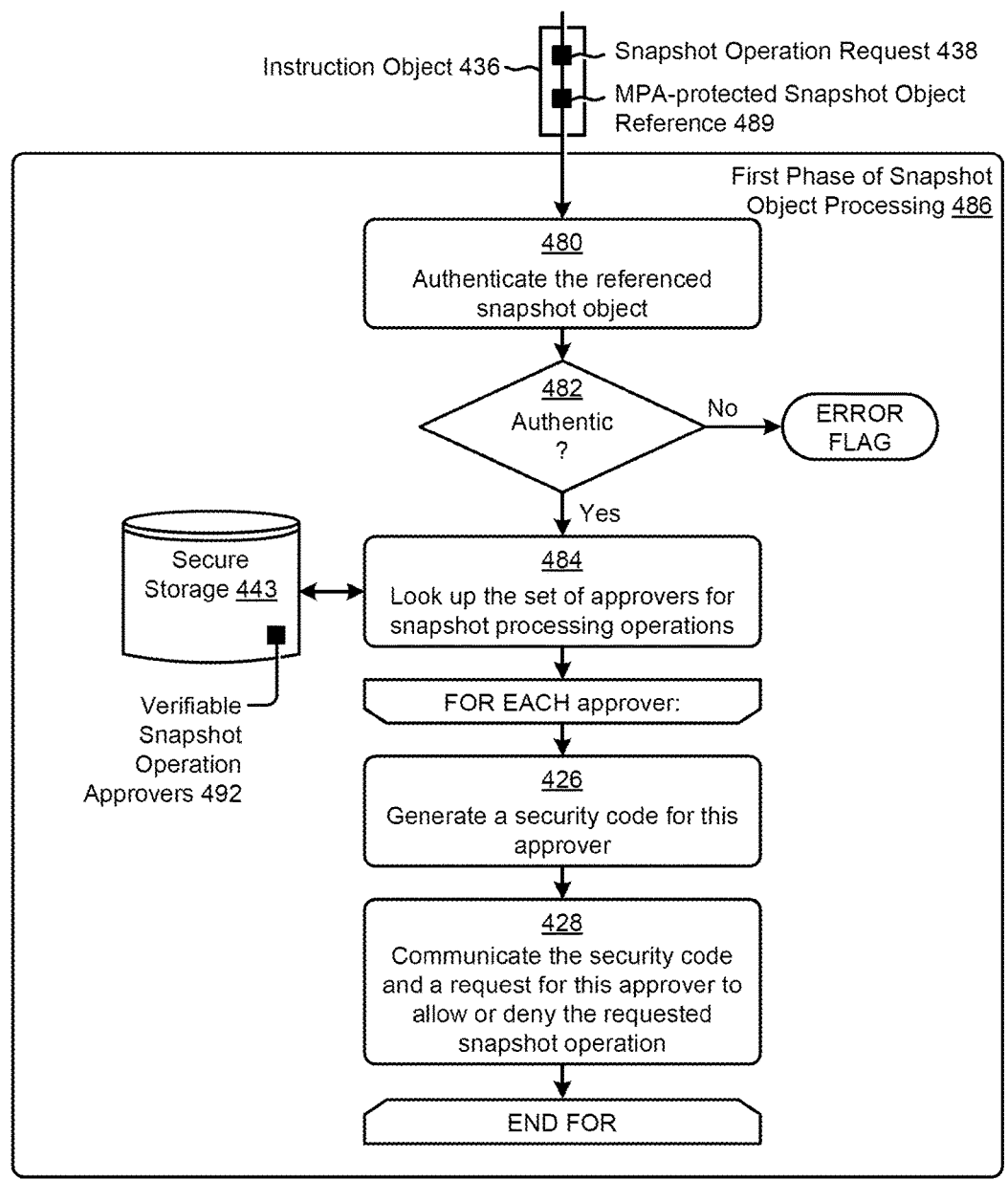
FIG. 4D shows a snapshot operation approval technique as used in systems that implement secure, multi-party authorizations to perform operations over snapshots of a computing cluster, according to an embodiment.
Figure 4D:
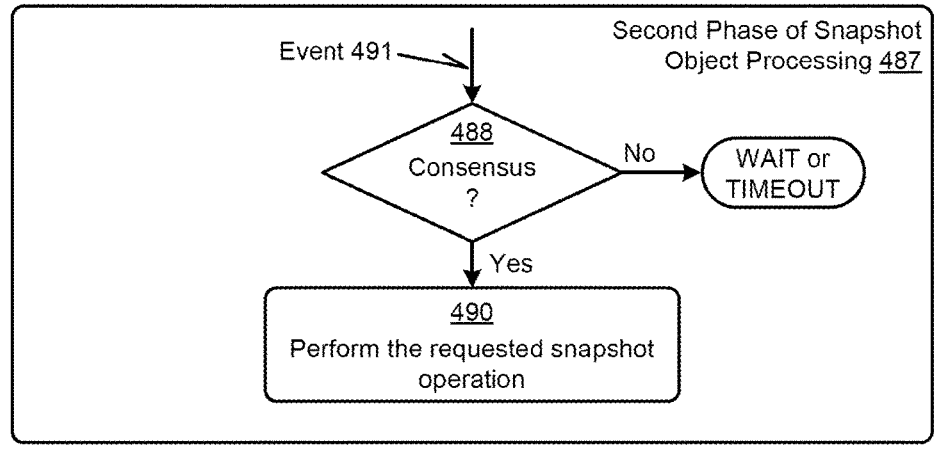

FIG. 4D shows a snapshot operation approval technique as used in systems that implement secure, multi-party authorizations to perform operations over snapshots of a computing cluster. As an option, one or more variations of snapshot operation approval technique 4D00 or any aspect thereof may be implemented in the context of the architecture and functionality of the embodiments described herein and/or in any environment.

The figure is being presented to illustrate how a particular snapshot operation request 438 can become the subject of a multi-party authorization protocol. More specifically, the figure is being presented to illustrate how a particular snapshot operation request can be processed in a manner where consensus is reached before the requested snapshot operation is performed.

In this particular embodiment, and as shown, the particular snapshot operation request can be processed across two asynchronously-operating phases of snapshot processing (e.g., first phase of snapshot object processing 486, and second phase of snapshot object processing 487) to reach consensus.

The shown first phase of snapshot object processing commences upon receipt of a snapshot operation request 438. The snapshot operation request may be accompanied by an MPA-protected snapshot object reference 489. In some embodiments, such as is depicted in FIG. 4D, the foregoing information is codified into an instruction object 436. At step 480 the subject snapshot object is authenticated. This step is performed to ensure that the snapshot object referred to in the request is actually a verified authentic snapshot object, and not some unauthentic or un-authenticatable data item produced by a malaprop and/or the malaprop's malware.

As used herein, a "prior version" of a snapshot is a collection of a set or sets of values of cluster data items that correspond to a particular point in time and that was not subjected to the malicious operations (e.g., was not subjected to malicious deletion, malicious encryption, or malicious destruction) of a ransomware attack. In some cases, a prior version is identified on the basis of how much (or little) data would be restored should a particular prior version be used. The determination of which one of a plurality of prior snapshot versions are to be selected can be based on an optimization function. Any combination of known-in-the-art selection and/or optimization techniques can be used to identify and select an optimal and verifiably authentic snapshot object.

Continuing discussion of the first phase of snapshot object processing, if, at decision 482, it is determined that the snapshot object referred to in the request is actually a verified authentic snapshot object, then the "Yes" branch of decision 482 is taken and processing continues to step 484. On the other hand, if it is determined that the snapshot object referred to in the request is not a verified authentic snapshot object, then the "No" branch of decision 482 is taken and an error flag is raised. This protects the cluster against the possibility that a snapshot object has been tampered with. For example, a malaprop might change the contents to a snapshot object to contain only null values or random values. Restoration from a modified (e.g., not authenticatable) snapshot object is to be avoided, and as such, there is no point in gaining consensus instead, processing can be stopped immediately, and an error flag can be emitted.

In some cases, additional checks are made to be certain that the subject snapshot object is a correct one.

Further details regarding general approaches to making certain that the subject snapshot object is a correct one are described in U.S. patent application Ser. No. 16/526,977 titled "VERIFYING SNAPSHOT INTEGRITY", filed on Jul. 30, 2019, which is hereby incorporated by reference in its entirety.

Now, in the event that the snapshot object is deemed to be authentic, then step 484 serves to look up a set of approvers for the requested operation. In some cases, different operations are associated with different sets of approvers. To ensure that a particular set of approvers is a legitimate set rather than a set that includes a malaprop, the sets of approvers are stored in secure storage 443. As such, it can be affirmed that the set of approvers taken from the secure storage are indeed verifiable snapshot operation approvers 492. The processing continues in a FOR EACH loop, where, for each verified approver, an approver-unique security code is generated (step 426), which approver-unique security code is communicated (step 428) to each verified approver, possibly with instructions for the verified approver to indicate his/her approval for the computing cluster to carry out the subject snapshot operation request. The FOR EACH loop iterates for each one of the verified approvers.

As heretofore indicated, there are two asynchronously-operating phases of snapshot processing. The shown second phase of snapshot object processing 487 can commence repeatedly, for example anytime there is an event such as an approval (e.g., event1 of FIG. 3), and/or a denial (e.g., event3 of FIG. 3), and/or a timeout event (e.g., event2 of FIG. 3). Each time the second phase is entered (e.g., upon event 491, as shown), a check is performed (e.g., test 488) to determine if a consensus has been reached. If a consensus has not yet been reached, then the "No" branch of test 488 is taken and the second phase of the protocol waits for a next event. On the other hand, when there are a sufficient number and/or types of events (e.g., considering some or all of approval events, denial events, and timeout events), the test 488 deems that consensus has been reached and the "Yes" branch of test 488 is taken such that performance of the requested snapshot operation is initiated (step 490).

Additional Embodiments of the Disclosure

Some embodiments pertain to use of multi-party authorizations as an enhancement to an identity and access module's design and to support the concept that multiple approvers are required to authorize any particular operation or data item modification. The concept of multi-party authorization extends RBAC models to offer an option to extend the RBAC permissions to also (or alternatively) perform a multi-party authorization workflow. Some examples are given hereunder.

Example 1: Suppose the action is to delete a snapshot. In that case, the flow would be: (1) check that the requesting user is permitted to delete the snapshot (e.g., via accessing the RBAC records), (2) permit the requesting user to navigate in a UI to a list of snapshots, (3) allow the requesting user to select a snapshot from the list that is to be deleted, and (4) wait for a deny or allow indication before taking actions that cause deletion of the snapshot. During the waiting time, a multi-party authorization check is performed so as gain approver consensus to allow the system to delete the selected snapshot. More specifically, if the permissions of the to-be-deleted snapshot is configured to support MPA, then the MPA workflow checks with multiple parties for approval to delete the snapshot. In one embodiment, an email or other notification is sent to however many approvers have been defined and codified into the MPA designation in a manner that facilitates machine-to-machine contact with the approvers. The foregoing email or other notification includes a security code.

After receipt of a needed approval notification (e.g., delivered via any known contact means), each approver logs into the system (with appropriate authentication credentials) to (1) provide the security code that was sent (e.g., via email or other contact means), and (2) approves (or denies) the delete transaction by activating an "APPROVE" button (or by activating a "DENY" button). Once some minimum number of approvers have approved the request (and none of the approvers have denied the request), the request to delete the snapshot will be granted.

Example 2: Security is hardened via operation of the MPA workflow such that the MPA workflow requires that the multiple parties who log into the computing cluster to provide a security code also satisfy a second factor authentication of a multi-factor authentication. More specifically, some embodiments require that at least a consensus number of participants in the multi-party authorization (MPA) consensus protocol log into the system to digitally sign an approval of the operation request.

Example 3: Security is hardened via operation of the MPA workflow such that any configuration change approval is signed using private keys. In some situations, security can be even still further hardened by encrypting the configuration change approval using blockchain cryptography. Moreover, in accordance with the herein-disclosed techniques, any approval for any operation on any cluster data item can be authorized (or denied) based on a digitally-signed approval that is generated based at least in part on blockchain encryption.

Example 4: Consensus can be deemed to have been reached by determining if a minimum number of parties have authorized the request to perform the operation.

System Architecture Overview

Additional System Architecture Examples

All or portions of any of the foregoing techniques can be partitioned into one or more modules and instanced within, or as, or in conjunction with, a virtualized controller in a virtual computing environment. Some example instances of virtualized controllers situated within various virtual computing environments are shown and discussed as pertains to FIG. 5A, FIG. 5B, FIG. 5C, and FIG. 5D.

Figure 5A:
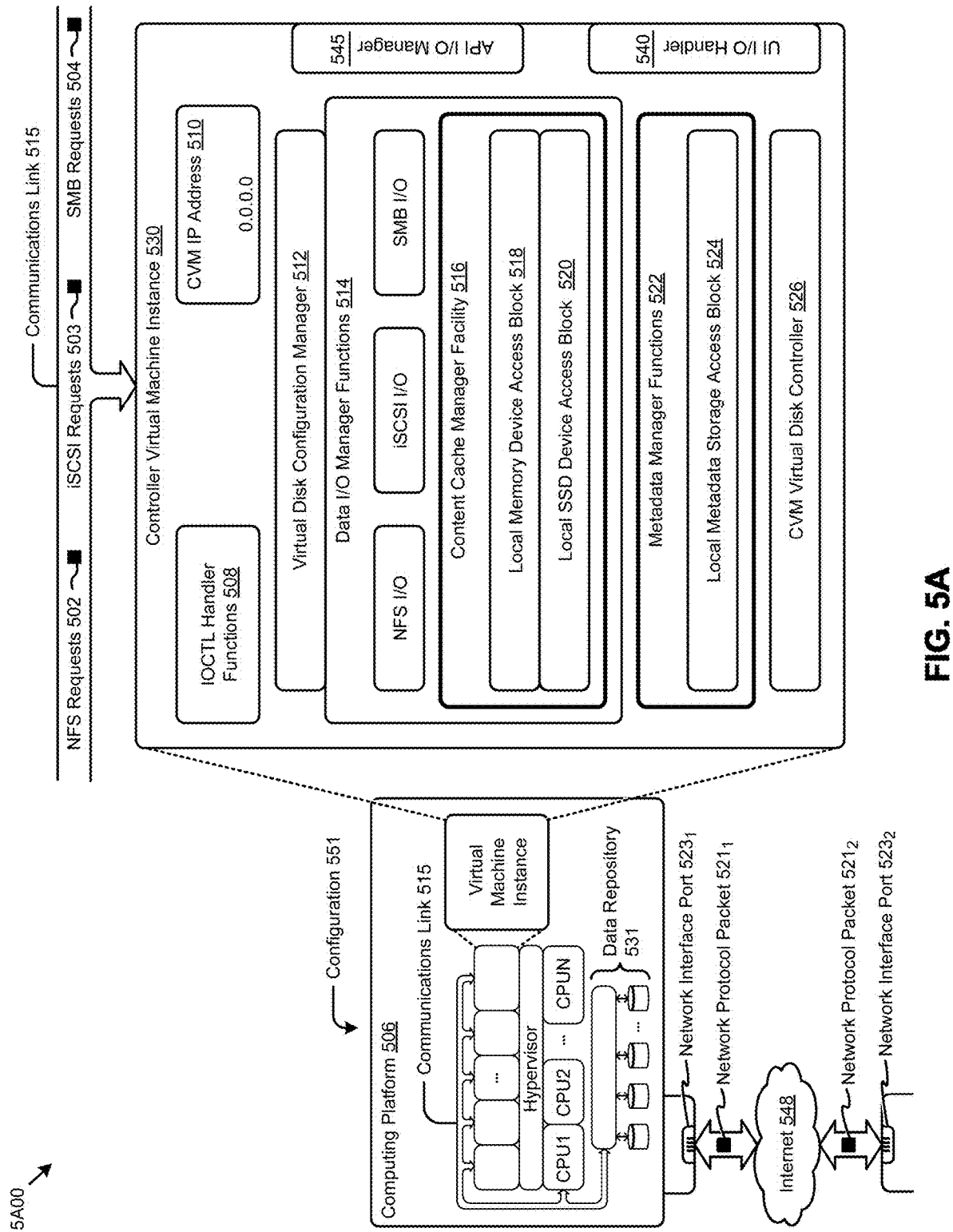
FIG. 5A, FIG. 5B, FIG. 5C, and FIG. 5D depict virtualization system architectures comprising collections of interconnected components suitable for implementing embodiments of the present disclosure and/or for use in the herein-described environments.

FIG. 5A depicts a virtualized controller as implemented in the shown virtual machine architecture 5A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 5A00 comprises a collection of interconnected components suitable for implementing embodiments of the present disclosure and/or for use in the herein-described environments. Moreover, virtual machine architecture 5A00 includes a virtual machine instance in configuration 551 that is further described as pertaining to controller virtual machine instance 530. Configuration 551 supports virtual machine instances that are deployed as user virtual machines, or controller virtual machines or both. Such virtual machines interface with a hypervisor (as shown). Some virtual machines are configured for processing of storage inputs or outputs (I/O or IO) as received from any or every source within the computing platform. An example implementation of such a virtual machine that processes storage I/O is depicted as 530.

In this and other configurations, a controller virtual machine instance receives block I/O storage requests as network file system (NFS) requests in the form of NFS requests 502, and/or internet small computer system interface (iSCSI) block IO requests in the form of iSCSI requests 503, and/or Samba file system (SMB) requests in the form of SMB requests 504. The controller virtual machine (CVM) instance publishes and responds to an internet protocol (IP) address (e.g., CVM IP address 510). Various forms of input and output can be handled by one or more IO control (IOCTL) handler functions (e.g., IOCTL handler functions 508) that interface to other functions such as data IO manager functions 514 and/or metadata manager functions 522. As shown, the data IO manager functions can include communication with virtual disk configuration manager 512 and/or can include direct or indirect communication with any of various block IO functions (e.g., NFS IO, iSCSI IO, SMB IO, etc.).

In addition to block IO functions, configuration 551 supports input or output (IO) of any form (e.g., block IO, streaming IO) and/or packet-based IO such as hypertext transport protocol (HTTP) traffic, etc., through either or both of a user interface (UI) handler such as UI IO handler 540 and/or through any of a range of application programming interfaces (APIs), possibly through API IO manager 545.

Communications link 515 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 530 includes content cache manager facility 516 that accesses storage locations, possibly including local dynamic random access memory (DRAM) (e.g., through local memory device access block 518) and/or possibly including accesses to local solid state storage (e.g., through local SSD device access block 520).

Common forms of computer readable media include any non-transitory computer readable medium, for example, floppy disk, flexible disk, hard disk, magnetic tape, or any other magnetic medium; compact disk read-only memory (CD-ROM) or any other optical medium; punch cards, paper tape, or any other physical medium with patterns of holes; or any random access memory (RAM), programmable read-only memory (PROM), erasable programmable read-only memory (EPROM), flash memory EPROM (FLASH-EPROM), or any other memory chip or cartridge. Any data can be stored, for example, in any form of data repository 531, which in turn can be formatted into any one or more storage areas, and which can comprise parameterized storage accessible by a key (e.g., a filename, a table name, a block address, an offset address, etc.). Data repository 531 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 524. The data repository 531 can be configured using CVM virtual disk controller 526, which can in turn manage any number or any configuration of virtual disks.

Execution of a sequence of instructions to practice certain embodiments of the disclosure are performed by one or more instances of a software instruction processor, or a processing element such as a central processing unit (CPU) or data processor or graphics processing unit (GPU), or such as any type or instance of a processor (e.g., CPU1, CPU2, . . . , CPUN). According to certain embodiments of the disclosure, two or more instances of configuration 551 can be coupled by communications link 515 (e.g., backplane, local area network, public switched telephone network, wired or wireless network, etc.) and each instance may perform respective portions of sequences of instructions as may be required to practice embodiments of the disclosure.

The shown computing platform 506 is interconnected to the Internet 548 through one or more network interface ports (e.g., network interface port $523_1$ and network interface port $523_2$). Configuration 551 can be addressed through one or more network interface ports using an IP address. Any operational element within computing platform 506 can perform sending and receiving operations using any of a range of network protocols, possibly including network protocols that send and receive packets (e.g., network protocol packet $521_1$ and network protocol packet $521_2$).

Computing platform 506 may transmit and receive messages that can be composed of configuration data and/or any other forms of data and/or instructions organized into a data structure (e.g., communications packets). In some cases, the data structure includes program instructions (e.g., application code) communicated through the Internet 548 and/or through any one or more instances of communications link 515. Received program instructions may be processed and/or executed by a CPU as it is received and/or program instructions may be stored in any volatile or non-volatile storage for later execution. Program instructions can be transmitted via an upload (e.g., an upload from an access device over the Internet 548 to computing platform 506). Further, program instructions and/or the results of executing program instructions can be delivered to a particular user via a download (e.g., a download from computing platform 506 over the Internet 548 to an access device).

Configuration 551 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (LAN) and/or through a virtual LAN (VLAN) and/or over a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to implementing multi-party authorizations within an identity and access management regime. In some embodiments, a module may include one or more state machines and/or combinational logic used to implement or facilitate the operational and/or performance characteristics pertaining to implementing multi-party authorizations within an identity and access management regime.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of implementing multi-party authorizations within an identity and access management regime). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to implementing multi-party authorizations within an identity and access management regime, and/or for improving the way data is manipulated when performing computerized operations pertaining to providing multi-party operation approval consensus prior to modification of computing cluster data items.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 5B:
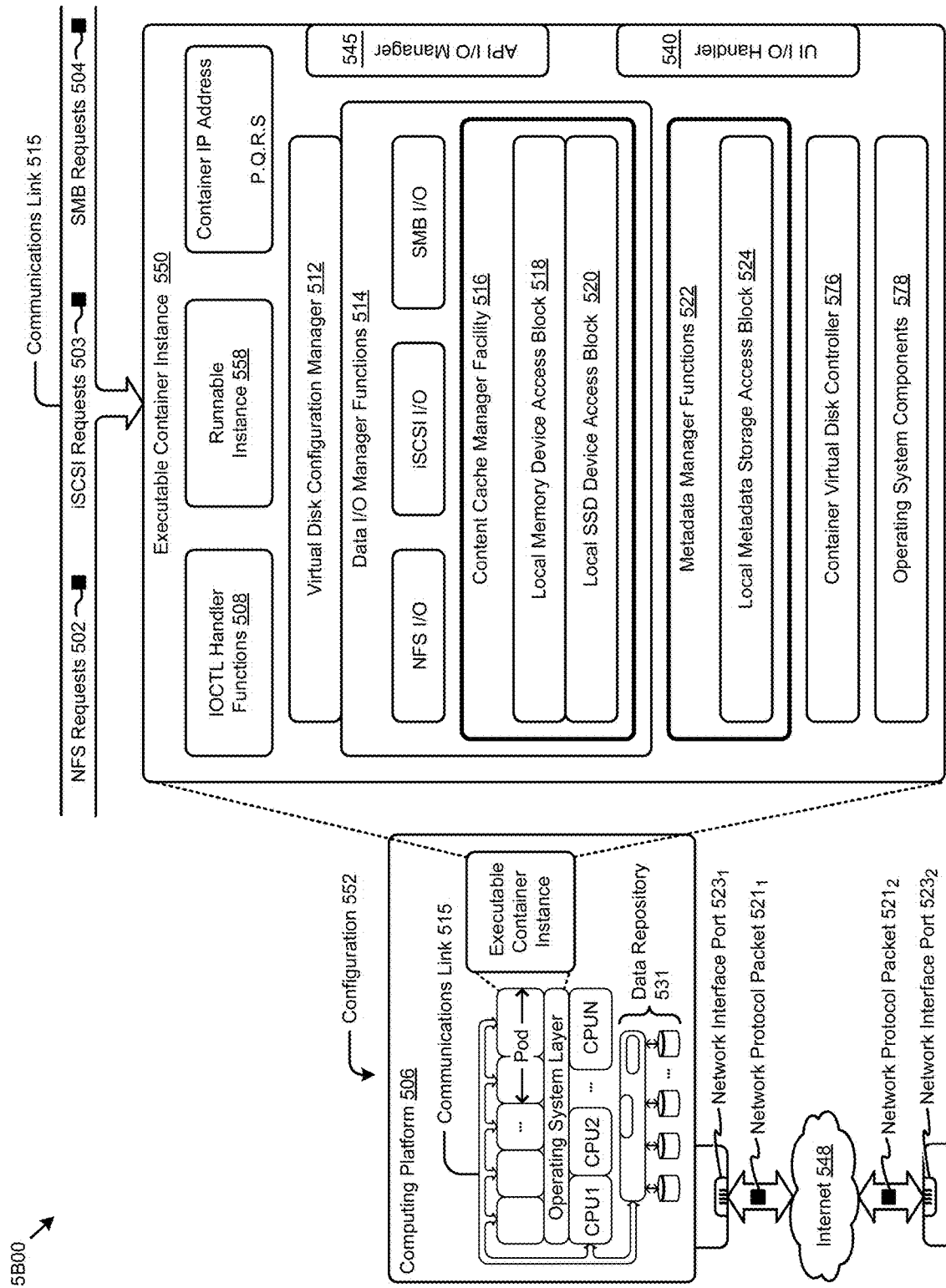

FIG. 5B depicts a virtualized controller implemented by containerized architecture 5B00. The containerized architecture comprises a collection of interconnected components suitable for implementing embodiments of the present disclosure and/or for use in the herein-described environments.

Moreover, the shown containerized architecture 5B00 includes an executable container instance in configuration 552 that is further described as pertaining to executable container instance 550. Configuration 552 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification, possibly including the hypertext transport protocol (HTTP or "http:") and/or possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 550). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls", "dir", etc.). The executable container might optionally include operating system components 578, however such a separate set of operating system components need not be provided. As an alternative, an executable container can include runnable instance 558, which is built (e.g., through compilation and linking, or just-in-time compilation, etc.) to include any or all of any or all library entries and/or operating system (OS) functions, and/or OS-like functions as may be needed for execution of the runnable instance. In some cases, a runnable instance can be built with a virtual disk configuration manager, any of a variety of data IO management functions, etc. In some cases, a runnable instance includes code for, and access to, container virtual disk controller 576. Such a container virtual disk controller can perform any of the functions that the aforementioned CVM virtual disk controller 526 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 5C:
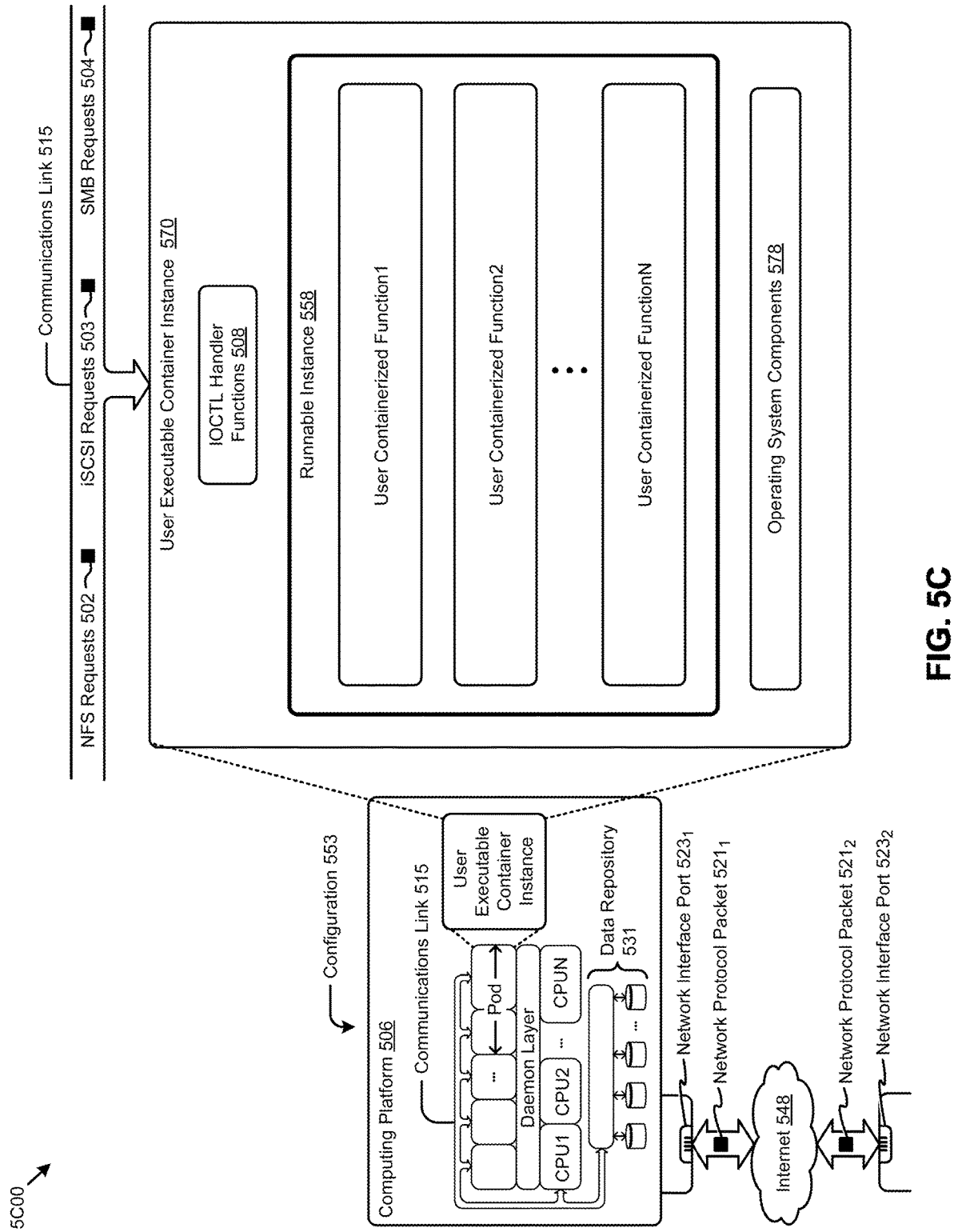

FIG. 5C depicts a virtualized controller implemented by a daemon-assisted containerized architecture 5C00. The containerized architecture comprises a collection of interconnected components suitable for implementing embodiments of the present disclosure and/or for use in the herein-described environments. Moreover, the shown daemon-assisted containerized architecture includes a user executable container instance in configuration 553 that is further described as pertaining to user executable container instance 570. Configuration 553 includes a daemon layer (as shown) that performs certain functions of an operating system.

User executable container instance 570 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 558). In some cases, the shown operating system components 578 comprise portions of an operating system, which portions are interfaced with or included in the runnable instance and/or any user containerized functions. In this embodiment of a daemon-assisted containerized architecture, the computing platform 506 might or might not host operating system components other than operating system components 578. More specifically, the shown daemon might or might not host operating system components other than operating system components 578 of user executable container instance 570.

The virtual machine architecture 5A00 of FIG. 5A and/or the containerized architecture 5B00 of FIG. 5B and/or the daemon-assisted containerized architecture 5C00 of FIG. 5C can be used in any combination to implement a distributed platform that contains multiple servers and/or nodes that manage multiple tiers of storage where the tiers of storage might be formed using the shown data repository 531 and/or any forms of network accessible storage. As such, the multiple tiers of storage may include storage that is accessible over communications link 515. Such network accessible storage may include cloud storage or networked storage (NAS) and/or may include all or portions of a storage area network (SAN). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 551 of FIG. 5A) to manage the interactions between the underlying hardware and user virtual machines or containers that run client software.

Distinct from user virtual machines or user executable containers, a special controller virtual machine (e.g., as depicted by controller virtual machine instance 530) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines-above the hypervisors-thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 5D:
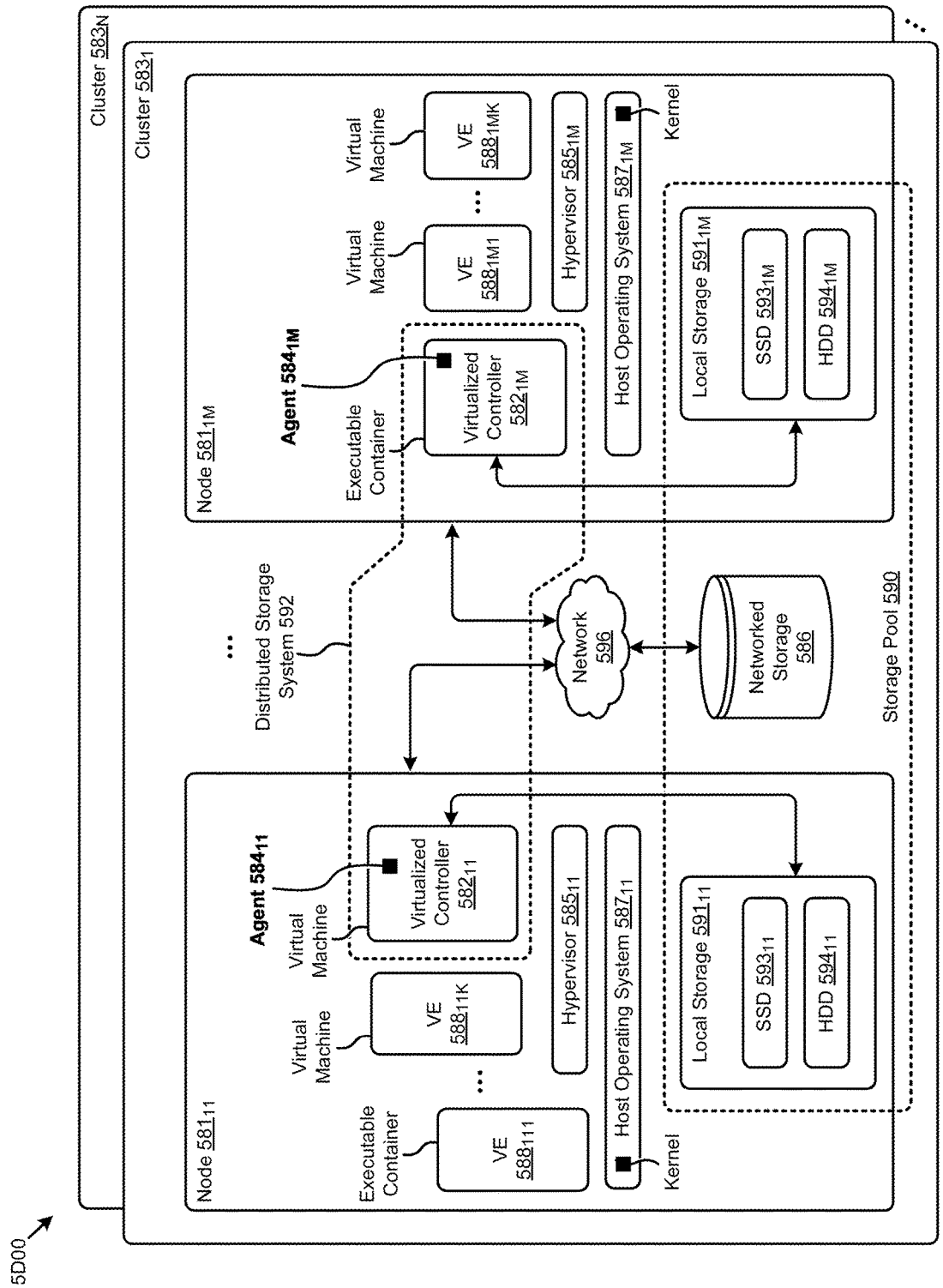

FIG. 5D depicts a distributed virtualization system in a multi-cluster environment 5D00. The shown distributed virtualization system is configured to be used to implement the herein disclosed techniques. Specifically, the distributed virtualization system of FIG. 5D comprises multiple clusters (e.g., cluster $583_1$, . . . , cluster $583_N$) comprising multiple nodes that have multiple tiers of storage in a storage pool. Representative nodes (e.g., node $581_{11}$, . . . , node $581_{1M}$) and storage pool 590 associated with cluster $583_1$ are shown. Each node can be associated with one server, multiple servers, or portions of a server. The nodes can be associated (e.g., logically and/or physically) with the clusters. As shown, the multiple tiers of storage include storage that is accessible through a network 596, such as a networked storage 586 (e.g., a storage area network or SAN, network attached storage or NAS, etc.). The multiple tiers of storage further include instances of local storage (e.g., local storage $591_{11}$, . . . , local storage $591_{1M}$). For example, the local storage can be within or directly attached to a server and/or appliance associated with the nodes. Such local storage can include solid state drives (SSD $593_{11}$, . . . , SSD $593_{1M}$), hard disk drives (HDD $594_{11}$, . . . HDD $594_{1M}$), and/or other storage devices.

As shown, any of the nodes of the distributed virtualization system can implement one or more user virtualized entities (VEs) such as the virtualized entity (VE) instances shown as VE $588_{111}$, . . . , VE $588_{11K}$, . . . , VE $588_{1Mk}$, . . . , VE $588_{1MK}$, and/or a distributed virtualization system can implement one or more virtualized entities that may be embodied as a virtual machines (VM) and/or as an executable container. The VEs can be characterized as software-based computing "machines" implemented in a container-based or hypervisor-assisted virtualization environment that emulates underlying hardware resources (e.g., CPU, memory, etc.) of the nodes. For example, multiple VMs can operate on one physical machine (e.g., node host computer) running a single host operating system (e.g., host operating system $587_{11}$, . . . , host operating system $587_{1M}$), while the VMs run multiple applications on various respective guest operating systems. Such flexibility can be facilitated at least in part by a hypervisor (e.g., hypervisor $585_{11}$, . . . , hypervisor $585_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers comprise groups of processes and/or may use resources (e.g., memory, CPU, disk, etc.) that are isolated from the node host computer and other containers. Such executable containers directly interface with the kernel of the host operating system (e.g., host operating system $587_{11}$, . . . , host operating system $587_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 590 by the VMs and/or the executable containers.

Multiple instances of such virtualized controllers can coordinate within a cluster to form the distributed storage system 592 which can, among other operations, manage the storage pool 590. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $581_{11}$ can interface with a controller virtual machine (e.g., virtualized controller $582_{11}$) through hypervisor $585_{11}$ to access data of storage pool 590. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 592. For example, a hypervisor at one node in the distributed storage system 592 might correspond to software from a first vendor, and a hypervisor at another node in the distributed storage system 592 might correspond to a second software vendor. As another virtualized controller implementation example, executable containers can be used to implement a virtualized controller (e.g., virtualized controller $582_{1M}$) in an operating system virtualization environment at a given node. In this case, for example, the virtualized entities at node $581_{1M}$ can access the storage pool 590 by interfacing with a controller container (e.g., virtualized controller $582_{1M}$) through hypervisor $585_{1M}$ and/or the kernel of host operating system $587_{1M}$.

In certain embodiments, one or more instances of an agent can be implemented in the distributed storage system 592 to facilitate the herein disclosed techniques. Specifically, agent $584_{11}$ can be implemented in the virtualized controller $582_{11}$, and agent $584_{1M}$ can be implemented in the virtualized controller $582_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions attendant to providing multi-party operation approval consensus prior to modification of computing cluster data items can be brought to bear through implementation of any one or more of the foregoing techniques. Moreover, any aspect or aspects of reducing the risk of malicious or inadvertent computing cluster data modifications can be implemented in the context of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts comprising:
storing a data item in a storage system;
identifying a possible ransomware attack on the data item that corresponds to a snapshot;
determining between (a) applying a multi-party authorization (MPA) consensus protocol and applying a role-based security control to the possible ransomware attack, based at least in part upon a result of analyzing the possible ransomware attack; and
upon determining that the MPA consensus protocol rather than the role-based security control is to be applied,
identifying a version of the snapshot; and
protecting the version of the snapshot at least by applying the MPA consensus protocol to the possible ransomware attack.

2. The non-transitory computer readable medium of claim 1, wherein participants in the multi-party authorization (MPA) consensus protocol are identified by at least one of a username, an email alias, or a phone number, and the snapshot has not been subject to at least the possible ransomware attack.

3. The non-transitory computer readable medium of claim 1, wherein whichever user that raised a requested operation pertaining to the possible ransomware attack is excluded from participation in the multi-party authorization (MPA) consensus protocol.

4. The non-transitory computer readable medium of claim 1, wherein at least one participant in the MPA consensus protocol further participates in a multi-factor authentication (MFA) protocol, or wherein there are at least three participants in the multi-party authorization (MPA) consensus protocol, and the at least three participants exclude a requestor of a requested operation pertaining to the possible ransomware attack.

5. The non-transitory computer readable medium of claim 1, wherein at least some participants in the multi-party authorization (MPA) consensus protocol log into the storage system to digitally sign an approval of a requested operation pertaining to the possible ransomware attack.

6. The non-transitory computer readable medium of claim 5, wherein a digitally-signed approval of the requested operation is generated using blockchain encryption.

7. The non-transitory computer readable medium of claim 1, further comprising the sequence of instructions which, when stored in the memory and executed by the processor, causes the processor to perform the acts, the acts further comprising:
determining whether a policy permits or disallows operations on the snapshot, wherein the operations include the possible ransomware attack; and
upon a determination that the policy disallows the operations on the snapshot, denying the possible ransomware attack prior to authenticating a user that requests for the possible ransomware attack, wherein
a prior version of the snapshot is identified and is protected upon or after determining that the policy permits the operations that include the possible ransomware attack on the data item.

8. The non-transitory computer readable medium of claim 4, wherein the at least one participant in the multi-factor authentication (MFA) protocol indicates authorization by providing user credentials as a first factor in the multi-factor authentication, and by providing a security code as a second factor of the multi-factor authentication.

9. A method, comprising:
storing a data item in a storage system;
identifying a possible ransomware attack on the data item that corresponds to a snapshot;
determining between (a) applying a multi-party authorization (MPA) consensus protocol and applying a role-based security control to the possible ransomware attack, based at least in part upon a result of analyzing the possible ransomware attack; and
identifying a version of the snapshot; and
protecting the version of the snapshot at least by applying the MPA consensus protocol to the possible ransomware attack.

10. The method of claim 9, wherein participants in the multi-party authorization (MPA) consensus protocol are identified by at least one of a username, an email alias, or a phone number, and the snapshot has not been subject to at least the possible ransomware attack.

11. The method of claim 9, wherein whichever user that raised a requested operation pertaining to the possible ransomware attack is excluded from participation in the multi-party authorization (MPA) consensus protocol.

12. The method of claim 9, wherein at least one participant of in the MPA consensus protocol further participates in a multi-factor authentication (MFA) protocol, or wherein there are at least three participants in the multi-party authorization (MPA) consensus protocol, and the at least three participants exclude a requestor of a requested operation pertaining to the possible ransomware attack.

13. The method of claim 9, wherein at least some participants in the multi-party authorization (MPA) consensus protocol log into the storage system to digitally sign an approval of a requested operation pertaining to the possible ransomware attack.

14. The method of claim 13, wherein a digitally-signed approval of the requested operation is generated using blockchain encryption.

15. The method of claim 9, further comprising the sequence of instructions which, when stored in the memory and executed by the processor, causes the processor to perform the acts, the acts further comprising:
determining whether a policy permits or disallows operations on the snapshot, wherein the operations include the possible ransomware attack; and
upon a determination that the policy disallows the operations on the snapshot, denying the possible ransomware attack prior to authenticating a user that requests for the possible ransomware attack, wherein
a prior version of the snapshot is identified and is protected upon or after determining that the policy permits the operations that include the possible ransomware attack on the data item.

16. The method of claim 12, wherein at least one participant in the multi-factor authentication (MFA) protocol indicates authorization by providing user credentials as a first factor in the multi-factor authentication, and by providing a security code as a second factor of the multi-factor authentication.

17. A system, comprising:
a storage medium having stored thereon a sequence of instructions; and
a processor that executes the sequence of instructions to cause the processor to perform acts, the acts comprising:

storing a data item in a storage system;
identifying a possible ransomware attack on the data item that corresponds to a snapshot; and
determining between (a) applying a multi-party authorization (MPA) consensus protocol and (b) applying a role-based security control to the possible ransomware attack, based at least in part upon a result of analyzing the possible ransomware attack; and
upon determining that the MPA consensus protocol rather than the role-based security control is to be applied, identifying a version of the snapshot; and
protecting the version of the snapshot at least by applying the MPA consensus protocol to the possible ransomware attack.

18. The system of claim 17, wherein participants in the multi-party authorization (MPA) consensus protocol are identified by at least one of a username, an email alias, or a phone number, and the snapshot has not been subject to at least the possible ransomware attack.

19. The system of claim 17, wherein whichever user that raised a requested operation pertaining to the possible ransomware attack is excluded from participation in the multi-party authorization (MPA) consensus protocol.

20. The system of claim 17, wherein at least one participant in the MPA consensus protocol further participates in a multi-factor authentication (MFA) protocol, or wherein there are at least three participants in the multi-party authorization (MPA) consensus protocol, and the at least three participants exclude a requestor of a requested operation pertaining to the possible ransomware attack.

21. The system of claim 17, wherein at least some participants in the multi-party authorization (MPA) consensus protocol log into the storage system to digitally sign an approval of a requested operation pertaining to the possible ransomware attack.

22. The system of claim 21, wherein a digitally-signed approval of the requested operation is generated using blockchain encryption.

23. The system of claim 17, the acts further comprising:
determining whether a policy permits or disallows operations on the snapshot, wherein the operations include the possible ransomware attack; and
upon a determination that the policy disallows the operations on the snapshot, denying the possible ransomware attack prior to authenticating a user that requests for the possible ransomware attack, wherein
a prior version of the snapshot is identified and is protected upon or after determining that the policy permits the operations that include the possible ransomware attack on the data item.

24. The system of claim 20, wherein at least one participant in the multi-factor authentication (MFA) protocol indicates authorization by providing user credentials as a first factor in the multi-factor authentication, and by providing a security code as a second factor of the multi-factor authentication.

* * * * *